United States Patent
Sakakibara et al.

(10) Patent No.: US 9,515,317 B2
(45) Date of Patent: Dec. 6, 2016

(54) SURFACE TREATING METHOD OF NEGATIVE ELECTRODE FOR MAGNESIUM SECONDARY BATTERY, NEGATIVE ELECTRODE FOR MAGNESIUM SECONDARY BATTERY, AND MAGNESIUM SECONDARY BATTERY

(71) Applicant: DENSO CORPORATION, Kariya, Aichi-pref. (JP)

(72) Inventors: Nobuyoshi Sakakibara, Nishio (JP); Norikazu Adachi, Nagoya (JP); Kenichirou Kami, Takahama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 244 days.

(21) Appl. No.: 14/136,231

(22) Filed: Dec. 20, 2013

(65) Prior Publication Data
US 2014/0174935 A1 Jun. 26, 2014

(30) Foreign Application Priority Data

Dec. 26, 2012 (JP) .................... 2012-283584
Aug. 26, 2013 (JP) .................... 2013-174917

(51) Int. Cl.
| | |
|---|---|
| *C25D 3/42* | (2006.01) |
| *H01M 4/38* | (2006.01) |
| *H01M 10/04* | (2006.01) |
| *H01M 10/054* | (2010.01) |
| *H01M 10/44* | (2006.01) |

(52) U.S. Cl.
CPC ............ *H01M 4/381* (2013.01); *C25D 3/42* (2013.01); *H01M 10/049* (2013.01); *H01M 10/054* (2013.01); *H01M 10/446* (2013.01)

(58) Field of Classification Search
CPC .......... H01M 10/446; H01M 10/049; H01M 10/054; H01M 4/381; C25D 3/42
See application file for complete search history.

(56) References Cited

U.S. PATENT DOCUMENTS

| | | | |
|---|---|---|---|
| 5,795,679 A | 8/1998 | Kawakami et al. | |
| 5,824,434 A | 10/1998 | Kawakami et al. | |
| 6,207,326 B1 | 3/2001 | Kawakami et al. | |
| 6,391,492 B1 | 5/2002 | Kawakami et al. | |

(Continued)

FOREIGN PATENT DOCUMENTS

| | | |
|---|---|---|
| JP | 2007-280627 | 10/2007 |
| JP | 2011-249175 A | 12/2011 |

OTHER PUBLICATIONS

Office Action dated Dec. 18, 2014 in corresponding Japanese Application No. 2013-174917.

(Continued)

*Primary Examiner* — Louis Rufo
(74) *Attorney, Agent, or Firm* — Harness, Dickey & Pierce, P.L.C.

(57) ABSTRACT

A surface treating method of a negative electrode for a magnesium secondary battery is provided, wherein the magnesium secondary battery includes: a negative electrode capable of releasing magnesium ions during discharging and capable of precipitating elemental magnesium during charging; a positive electrode capable of precipitating a magnesium oxide during the discharging and capable of releasing magnesium ions during the charging; and a non-aqueous ion conductor for conducting magnesium ions as conduction species. The surface treating method comprises initializing the negative electrode by performing the discharging to form a bare surface at a surface of the negative electrode.

18 Claims, 20 Drawing Sheets

(56) References Cited

U.S. PATENT DOCUMENTS

| | | |
|---|---|---|
| 6,395,423 B1 | 5/2002 | Kawakami et al. |
| 2002/0031701 A1 | 3/2002 | Kawakami et al. |
| 2007/0180688 A1 | 8/2007 | Kawakami et al. |
| 2012/0028137 A1* | 2/2012 | Chase .................. H01M 4/382 429/405 |
| 2013/0319870 A1* | 12/2013 | Chen .................... H01M 4/133 205/86 |
| 2014/0197797 A1* | 7/2014 | Yamazaki ............ H02J 7/0029 320/128 |

OTHER PUBLICATIONS

Office Action mailed Sep. 1, 2015 in the corresponding Japanese Application No. 2013-174917 with English translation.

* cited by examiner

SAMPLE NO. 28

SAMPLE NO. 29

FIG. 21

| SAMPLE NO. | 1 | | | | | 2 | | | | | 3 | 4 | COMP. EXAMPLE |
|---|---|---|---|---|---|---|---|---|---|---|---|---|---|
| PLOT IN FIG | P1-1 | P1-2 | P1-3 | P1-4 | P2-1 | P2-2 | P2-3 | P2-4 | P2-5 | | P3 | P4 | S |
| MAGNESIUM BATTERY | | | | | | | Ba | | | | | | |
| DISCHARGE CAPACITY DENSITY: X (mAh/cm$^2$) | 0.604 | 0.604 | 0.604 | 0.604 | 0.604 | 1.21 | 1.8 | 1.8 | 3.02 | | 1.44 | 1.44 | — |
| DISCHARGE CURRENT DENSITY: Y (mA/cm$^2$) | 0.11 | 0.28 | 1.13 | 5.66 | 2.27 | 2.27 | 2.27 | 2.27 | 2.27 | | 1.8 | 1.8 | — |
| NEGATIVE ELECTRODE IMPEDANCE: Z (Ωcm$^2$) | 5800 | 2014 | 1175 | 898 | 1050 | 681 | 427 | 327 | 184 | | *45589 | *5060 | *19073 |
| ELAPSED TIME (min) | — | — | — | — | — | — | — | — | — | | 1774 | 1770 | 1747 |
| X × Y | 0.066 | 0.169 | 0.683 | 3.419 | 1.371 | 2.747 | 4.086 | 4.086 | 6.855 | | 2.592 | 2.592 | — |
| AREA IN FIG. 5 | OUT OF AREA | V | IV | III | IV | III | II | II | I | | — | — | — |
| O$_2$ SUPPLY DURING DISCHARGE | NONE | NONE | NONE | NONE | NONE | NONE | NONE | NONE | NONE | | NONE | YES | NONE |
| SEM PHOTOGRAPH | | | | | *(FIG. 1) | | | | *(FIG. 2) | | | | |

FIG. 22

| SAMPLE NO. | 21 | 22 | 23 | 24 | 25 | 26 | 27 | 28 | 29 | 30 | 32 | 34 | 36 | COMP. EXAMPLE |
|---|---|---|---|---|---|---|---|---|---|---|---|---|---|---|
| PLOT IN FIG | P21 | P22 | P23 | P24 | P25 | P26 | P27 | - | - | P30 | P32 | P34 | P36 | S |
| MAGNESIUM BATTERY | Ba | | | | | | | | | | Bb | | | Ba |
| DISCHARGE CAPACITY DENSITY: X (mAh/cm$^2$) | 1.2 | 18 | 1.8 | 1.8 | 1.8 | 2.42 | 2.42 | 1.8 | 1.8 | 1.8 | - | - | - | - |
| CHARGE CAPACITY DENSITY: U (mAh/cm$^2$) | 1.2 | | 1.8 | 1.8 | 1.8 | - | 2.42 | - | 1.8 | | | | | - |
| CHARGE CAPACITY DENSITY: U' (mAh/cm$^2$) | | | | | | | | | | | 1.8 | 1.8 | 1.8 | |
| DISCHARGE CURRENT DENSITY: Y (mA/cm$^2$) | 2.26 | 2.26 | 2.26 | 2.26 | 2.26 | 2.27 | 2.27 | 2.27 | 2.27 | 2.26 | | | | |
| CHARGE CURRENT DENSITY: W (mA/cm$^2$) | 2.26 | 2.26 | 2.26 | 2.26 | 2.26 | - | 2.27 | - | 2.27 | | | | | |
| CHARGE CURRENT DENSITY: W' (mA/cm$^2$) | | | | | | | | | | - | 0.28 | 0.57 | 2.26 | |
| NEGATIVE ELECTRODE IMPEDANCE: Z (Ωcm$^2$) | *1001 | *1272 | *1035 | *535 | *438 | 275 | 95 | 184 | 94 | *55000 | - | *1000 | - | *19073 |
| NEGATIVE ELECTRODE IMPEDANCE: Z' (Ωcm$^2$) | | | | | | | | | | - | *5000 | *1000 | *1000 | |
| ELAPSED TIME (min) | 1200 | 1262 | 1262 | 1258 | 1258 | - | - | - | - | 3685 | 4166 | 3130 | 4116 | 1747 |
| O$_2$ SUPPLY DURING DISCHARGE | NONE | NONE | NONE | YES | NONE | NONE | NONE | NONE | NONE | - | - | - | - | - |
| O$_2$ SUPPLY DURING CHARGE | NONE | NONE | NONE | YES | YES | NONE | NONE | - | NONE | - | - | - | - | - |
| SEM PHOTOGRAPH | | | | | | | *(FIG.10) | *(FIG.11) | | | | | | |

FIG. 23

| SAMPLE NO. | 30 | 31 | 32 | 33 | 34 | 35 | 36 | 37 |
|---|---|---|---|---|---|---|---|---|
| PLOT IN FIG. 9 | P30 | - | P32 | - | P34 | - | P36 | - |
| MAGNESIUM BATTERY | | | | | Bb | | | |
| DISCHARGE CAPACITY DENSITY: X (mAh/cm²) | 1.8 | - | - | - | - | - | - | - |
| CHARGE CAPACITY DENSITY: U' (mAh/cm²) | - | 1.8 | 1.8 | 1.8 | 1.8 | 1.8 | 1.8 | 1.8 |
| DISCHARGE CURRENT DENSITY: Y (mA/cm²) | 2.26 | - | - | - | - | - | - | - |
| CHARGE CURRENT DENSITY: W' (mA/cm²) | - | 0.057 | 0.28 | 0.42 | 0.57 | 1.13 | 2.26 | 3.398 |
| NEGATIVE ELECTRODE IMPEDANCE: Z (Ωcm²) | *55000 | - | *5000 | - | *1000 | - | *1000 | - |
| NEGATIVE ELECTRODE IMPEDANCE: Z' (Ωcm²) | 3685 | - | 4166 | - | 3130 | - | 4116 | - |
| PORE SIZE DISTRIBUTION | | | | | | | *(FIG. 12) | |
| EFFECTIVE SURFACE AREA (m²) | - | LESS THAN MEASURABLE LOWER LIMIT | - | - | 0.18 | - | 0.18 | 0.18 |
| SURFACE AREA INCREMENT | - | 20 TIMES OR LESS | - | - | 3500 TIMES | - | 3500 TIMES | 3500 TIMES |
| (A) Mg:O (at%) | - | 56:44 | 52:48 | - | 48:52 | 48:52 | 48:52 | 48:52 |
| (B) Mg:MgOx (%) | - | 13:87 | 8:92 | - | 7:93 | 6.5:93.5 | 3:97 | 3:97 |
| (C) MgO:MgO₂ (%) | - | 82:18 | 80:20 | - | 75:25 | 72:28 | 66:34 | 64:36 |
| X-RAY DIFFRACTION | | | | | | | *(FIG. 17) | |

SURFACE TREATING METHOD OF NEGATIVE ELECTRODE FOR MAGNESIUM SECONDARY BATTERY, NEGATIVE ELECTRODE FOR MAGNESIUM SECONDARY BATTERY, AND MAGNESIUM SECONDARY BATTERY

CROSS REFERENCE TO RELATED APPLICATION

The present application is based on Japanese Patent Applications No. 2012-283584 filed on Dec. 26, 2012 and No. 2013-174917 filed on Aug. 26, 2013, disclosures of which are incorporated herein by reference.

TECHNICAL FIELD

The present disclosure relates to a surface treating method of a negative electrode for a magnesium secondary battery, a negative electrode for a magnesium secondary battery, and a magnesium secondary battery.

BACKGROUND

In recent years, with a view point of environmental problems and energy crises, there are increasing expectations for hybrid vehicles and electric vehicles. With such background, there is a demand for an energy storage device that can be repeatedly charged and discharged and provide high energy.

For example, JP-H08-124568A corresponding to U.S. Pat. No. 5,795,679B discloses an electric power storage device such as a lithium secondary battery having a high energy density and a long cycle life. Specifically, from an alloy powder of an amphoteric metal that forms a negative electrode, part of amphoteric metal is selectively eluted and etched. That is, a technology for obtaining a negative electrode material which is uniform and has a large specific surface area is disclosed.

However, while the lithium ion secondary battery is a prospective electric power storage device, the storable energy density is limited.

Then, in order to develop an electric power storage device that can provide more excellent energy density than the lithium ion secondary battery, the inventors of the present application have studied a magnesium secondary battery as such a device. Discussion based on the inventors' studies will be given below as related arts.

Magnesium, which is generally used as a negative electrode material in a magnesium secondary battery, is an extremely oxidizable metal. According to the diagram of free energy of oxide formation and temperature and oxygen partial pressure (so-called Ellingham diagram), an equilibrium oxygen partial pressure of magnesium and magnesium oxide at a room temperature is about $10^{-200}$ Pa. This means that the oxidation reaction of magnesium proceeds at an oxygen partial pressure equal to or higher than the above-described level. There is a problem that, as well as in atmospheric air, an oxide is formed at a surface of magnesium even in a globe box filled with an inert gas used upon manufacture of a battery and samples for analysis.

In the magnesium secondary battery, elemental magnesium is often used as a negative electrode active material. The electric resistivity of a magnesium oxide mainly formed from elemental magnesium is outstandingly higher than that of elemental magnesium (compound containing a magnesium oxide that increases the impedance of an electrode is hereinafter referred to as "high impedance compound").

Actually, the inventors of the present application assembled magnesium secondary batteries in a globe box by substantially the same method as in the later-described embodiment and measured the impedance of the magnesium negative electrode by substantially the same method as in the later-described embodiment. As illustrated in FIG. 20, the impedance of the magnesium negative electrode varied from several thousands $\Omega cm^2$ to several tens thousands $\Omega cm^2$. When three electrode cells were assembled in the globe box, the surface of the magnesium negative electrode was polished by a glass edge, to remove the magnesium oxide formed on the surface of the elemental magnesium. At a moment when the instance elemental magnesium was polished, a pure metal surface of magnesium was exposed. However, magnesium at the pure metal, surface reacts with oxygen remaining in the globe box. As a result, the impedance of the magnesium negative electrode was increased even just after the assembling of the three electrode cell. On the other hand, when substantially the same experiment was performed for elemental lithium, the impedance of the lithium negative electrode was stable at several tens $\Omega cm^2$.

High impedance of the electrode means that the overvoltage of the electrode increases when the current density is high. For example, the negative electrode impedance of the magnesium secondary battery is assumed to be 10,000 $\Omega cm^2$. When the battery is charged/discharged at a current density of 1 mA/cm$^2$, the overvoltage of the negative electrode is 10 V. Generally, the electromotive force of a secondary battery is several V. Accordingly, there is a relation: electromotive force<negative electrode overvoltage. Charging/discharging at a current density of 1 mA/cm$^2$ is impossible.

SUMMARY

The present disclosure is made in view of the foregoing. For example, the present disclosure addresses a problem that the high negative electrode impedance increases the overvoltage of the negative electrode and it is impossible to perform charging/discharging at a practical current density and that the output voltage of the battery tends to be impaired greatly. It an object of the present disclosure to provide a surface treating method of a negative electrode for a magnesium secondary battery, a negative electrode for a magnesium secondary battery, and a magnesium secondary battery that can decrease the negative electrode impedance in the magnesium secondary battery and can suppress the overvoltage of the negative electrode to a practicable level.

According to a first example of embodiments, a surface treating method of a negative electrode for a magnesium secondary battery is provided, wherein the magnesium secondary battery includes: a negative electrode for releasing magnesium ions during discharging and for precipitating elemental magnesium during charging; a positive electrode for precipitating a magnesium oxide during the discharging and for releasing magnesium ions during the charging; and a non-aqueous ion conductor for conducting magnesium ions as conduction species. The surface treating method comprising performing an initializing discharge process to initialize the negative electrode. The initializing discharge process includes, by performing discharging, forming a bare surface at a surface of the negative electrode.

According to a second example of the present disclosure, a negative electrode for a magnesium secondary battery applied with the above-described surface treating method is provided.

According to a third example of the present disclosure, a magnesium secondary battery comprising the above-described negative electrode is provided.

According to a fourth example of the present disclosure, a surface treating method of a negative electrode for a magnesium secondary battery, wherein the magnesium secondary battery includes: a negative electrode for releasing magnesium ions during discharging and for precipitating elemental magnesium during charging; a positive electrode for precipitating a magnesium oxide during the discharging and for releasing magnesium ions during the charging; a non-aqueous ion conductor for conducting magnesium ions as conduction species. The surface treating method comprises: performing an initializing discharge process to initialize the negative electrode, wherein the initializing discharge process includes, by performing discharging, forming a bare surface at a surface of the negative electrode; and performing a charge process after the initializing discharge process, wherein the charge process includes, by performing charging, forming a magnesium film at the surface of the negative electrode.

According to a fifth example of the present disclosure, a negative electrode for a magnesium secondary battery applied with the above-described surface treating method is provided.

According to a sixth example of the present disclosure, a magnesium secondary battery comprising the above-described negative electrode is provided.

According to the above surface treating method, the above negative electrode and the above magnesium secondary battery, the negative electrode impedance can be decreased in the surface treating method including the initializing discharge process, in which the bare surface is formed at the negative electrode to initialize the surface of the negative electrode.

Further, when the charge process including forming the magnesium layer to the bare surface formed at the negative electrode by the discharging is performed, the magnesium layer hinders re-formation of the high impedance compound at the surface of the negative electrode. Accordingly, formation of the magnesium layer can suppress an increase of the negative electrode impedance and a decrease the saturation upper limit value of the negative electrode impedance.

Further, by providing the negative electrode for the magnesium secondary battery applied with the surface treatment method: and the magnesium secondary battery using such a negative electrode, it is possible to provide a magnesium secondary battery in which the overvoltage of the negative electrode is suppressed to a practicable level.

When the magnesium secondary battery is compared with a lithium ion secondary battery, since a magnesium ion has a larger number of valence, the magnesium secondary battery can have a higher energy density per unit volume. Further, the magnesium secondary battery has the following advantages: magnesium does not form dendrites during precipitation as in the case of lithium; the melting point is higher than that of lithium; poisoning nature is low; safety is excellent; and further, the cost is low.

BRIEF DESCRIPTION OF THE DRAWINGS

The above and other objects, features and advantages of the present disclosure will become more apparent from the following detailed description made with reference to the accompanying drawings. In the drawings:

FIG. 21 is a diagram illustrating a discharge capacity density, a discharge current density, a negative electrode impedance etc. for samples No. 1-4;

FIG. 22 is a diagram, illustrating a discharge capacity density, a charge capacity density, a discharge current density, a charge current density, a negative electrode impedance etc. for samples No. 21-36; and FIG. 23 is a diagram illustrating a discharge capacity density, a charge capacity density, a discharge current density, a charge current density, a negative electrode impedance, a pore size distribution etc. for samples No. 30-37.

Figure 1:
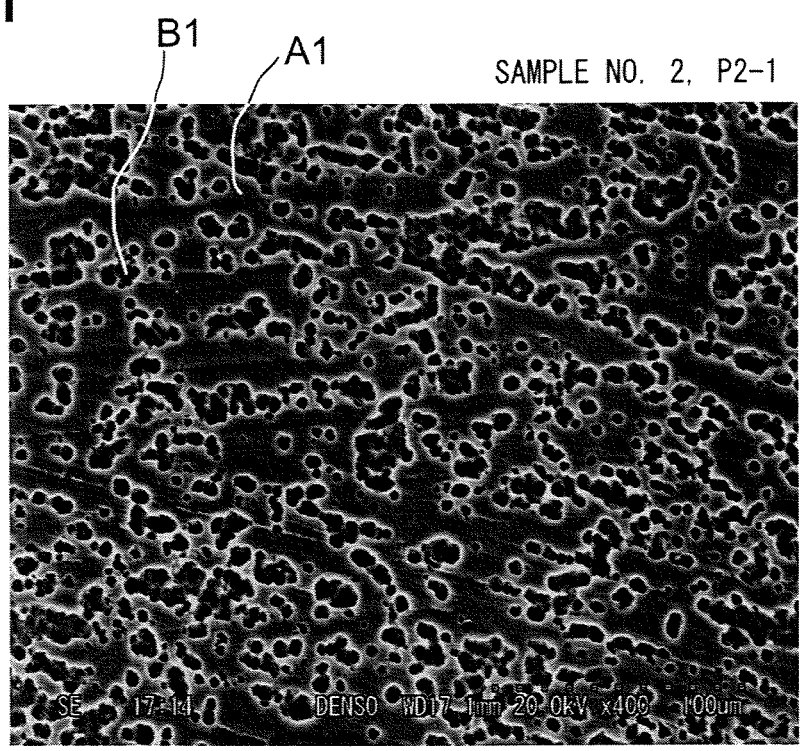
FIG. 1 is a SEM photograph of a bare surface formed partially on a surface of a negative electrode.

DETAILED DESCRIPTION (Surface Treating Method of Negative Electrode for Magnesium Secondary Battery)

A method of treating a surface of a negative electrode for a magnesium secondary battery according to an embodiment of the present disclosure will be described.

The method of treating the surface of a negative electrode for a magnesium secondary battery according to the embodiment of the present disclosure includes an initializing discharge process of initializing a negative electrode by performing discharging to form a bare surface at the surface of the negative electrode and a charge process of performing charging thereby forming a magnesium layer on the surface of the negative electrode successively. Other procedures than the initializing discharge process and the charge process may be those in a known surface treating method.

The magnesium secondary battery according to the embodiment of the present disclosure includes a negative electrode capable of releasing magnesium ions during discharging and precipitating elemental magnesium during charging, a positive electrode capable of precipitating magnesium oxide during the discharging and releasing magnesium ions during the charging, and a non-aqueous ion conductor that conducts magnesium ions as conduction species. In this embodiment, the charge process is performed after the initializing discharge process to the negative electrode for the magnesium secondary battery described above.

(Battery Assembling)

The negative electrode can be formed, for example, of elemental magnesium. The negative electrode can be assembled in a battery in an atmosphere filled with an inert gas such as argon. Even when the magnesium negative electrode is assembled to the battery just after polishing the surface of elemental magnesium, the negative electrode reacts with oxygen slightly remaining in the surroundings. Then, the magnesium monoxide as a high impedance compound is formed at the surface of the negative electrode. Description is to be made assuming elemental magnesium as the negative electrode material and the high impedance compound before initial discharging as the magnesium monoxide.

In the positive electrode, oxygen can be an active material. For example, by supplying oxygen into a battery system, oxygen and magnesium ion are reacted to form a magnesium oxide during the discharging and, on the other hand, decomposing reaction can be taken place during the charging. Supply of oxygen to the battery system can include, for example, a method of configuring the positive electrode as an air electrode and supplying atmospheric oxygen or pure oxygen into the battery system but the method is not limited. Other method, for example, of directly blowing oxygen into the ion conductor may also be used.

By using the negative electrode and the positive electrode, and other predetermined elements, the magnesium secondary battery may be assembled in a manner similar to a known manner of assembling a magnesium secondary battery.

(Initializing Discharge Process)

The initializing discharge process according to this embodiment is a process of initializing the negative electrode by forming a bare surface at the surface of the negative electrode. The discharging forming the bare surface at the surface of the negative electrode is discharging for removing the magnesium oxide on the surface of the negative electrode. The surface of the negative electrode is initialized by the discharging. Specifically, the discharging is performed to the magnesium secondary battery assembled as described above in this embodiment under a condition of eluting magnesium till a bare surface is exposed to the surface of the negative electrode. The discharging is different from the discharging in actual use of the magnesium secondary battery. In the usual actual use, discharging is not conducted under such a strong condition of eluting magnesium till the bare surface is exposed.

It may be preferable that the discharge capacity density upon performing the initializing discharge process be determined in accordance with the amount of magnesium material to be eluted for forming the bare surface.

The surface of the negative electrode just after starting the discharging soon after the initializing discharge process can be illustrated, for example, by a SEM photograph of FIG. 1, which is taken in the example to be described later. In the FIG. 1, indefinite portions formed here and there in the shape of dark spots as shown at B1 are a concave bare surface B1 formed at the surface of the negative electrode by performing the initializing discharge process. Somewhat bright portions as shown by A1 are flat surface A1 of the negative electrode in which the bare surface is not yet formed but is merely extended in a planar shape.

As illustrated in FIG. 1, the magnesium negative electrode is not eluted uniformly over the entire surface by performing the initializing discharge process just after starting the discharging. The magnesium negative electrode is started to be eluted not uniformly from the surface of the negative electrode. The concave bare surface B1 is exposed here and there in the negative electrode as a result of not uniform elution of magnesium. An original flat surface A1 as a polished surface of the elemental magnesium is left at the surface of the negative electrode. It is considered that more magnesium monoxide is formed at the flat surface A1. After exposing the concave bare surface B1, a trend is observed in which magnesium is eluted preferentially from the concave bare surface B1 to that from the flat surface A1. The initializing discharge process is performed for compulsorily eluting also the magnesium negative electrode at the less eluting flat surface A1. It may be preferable to perform the initializing discharge process so as to form the concave bare surface B1 over the entire surface of the magnesium negative electrode. Therefore, it can be considered that a discharge capacity corresponding to the amount of the magnesium material for the entire volume to be eluted is necessary.

In the battery system, an oxidation reaction of "reacting magnesium with oxygen" may possibly occur by residual oxygen. Therefore, it may be preferable that the discharge current density upon performing the initializing discharge process be determined such that the reaction rate of "eluting magnesium" is higher than the rate of oxidation reaction of "reacting magnesium with oxygen" at the negative electrode.

Figure 3:
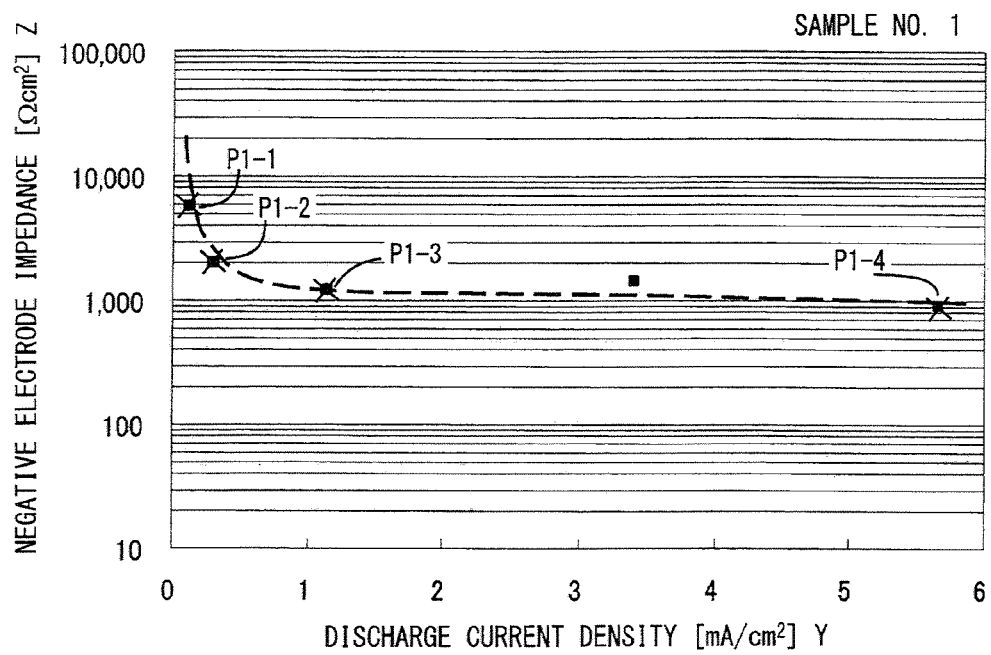
FIG. 3 is a graph illustrating a relation between a discharge current density and a negative electrode impedance.
Figure 4:
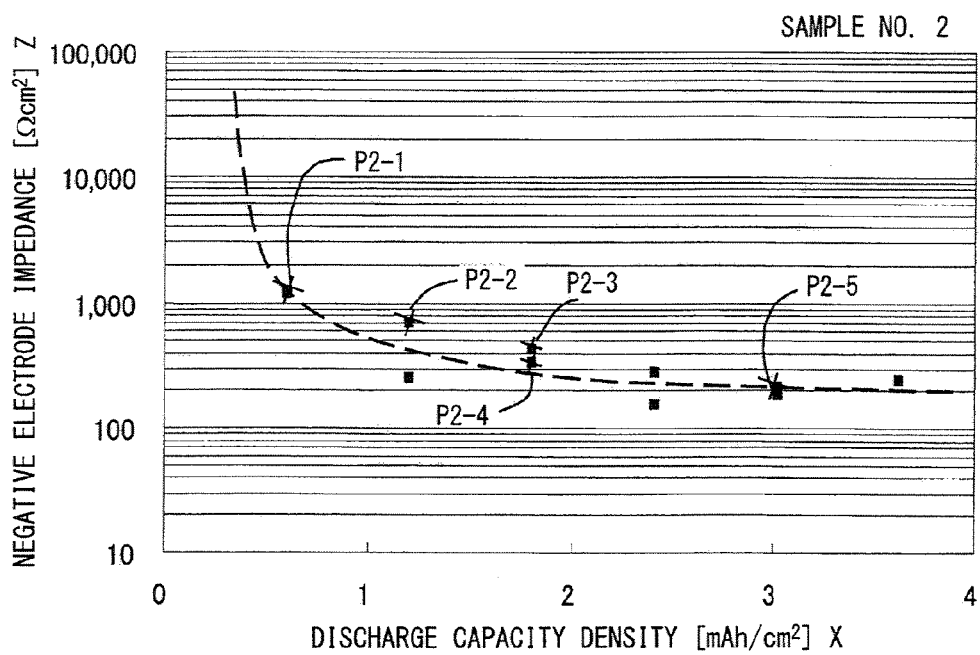
FIG. 4 is a graph illustrating a relation between a discharge capacity density and a negative electrode impedance.
Figure 5:
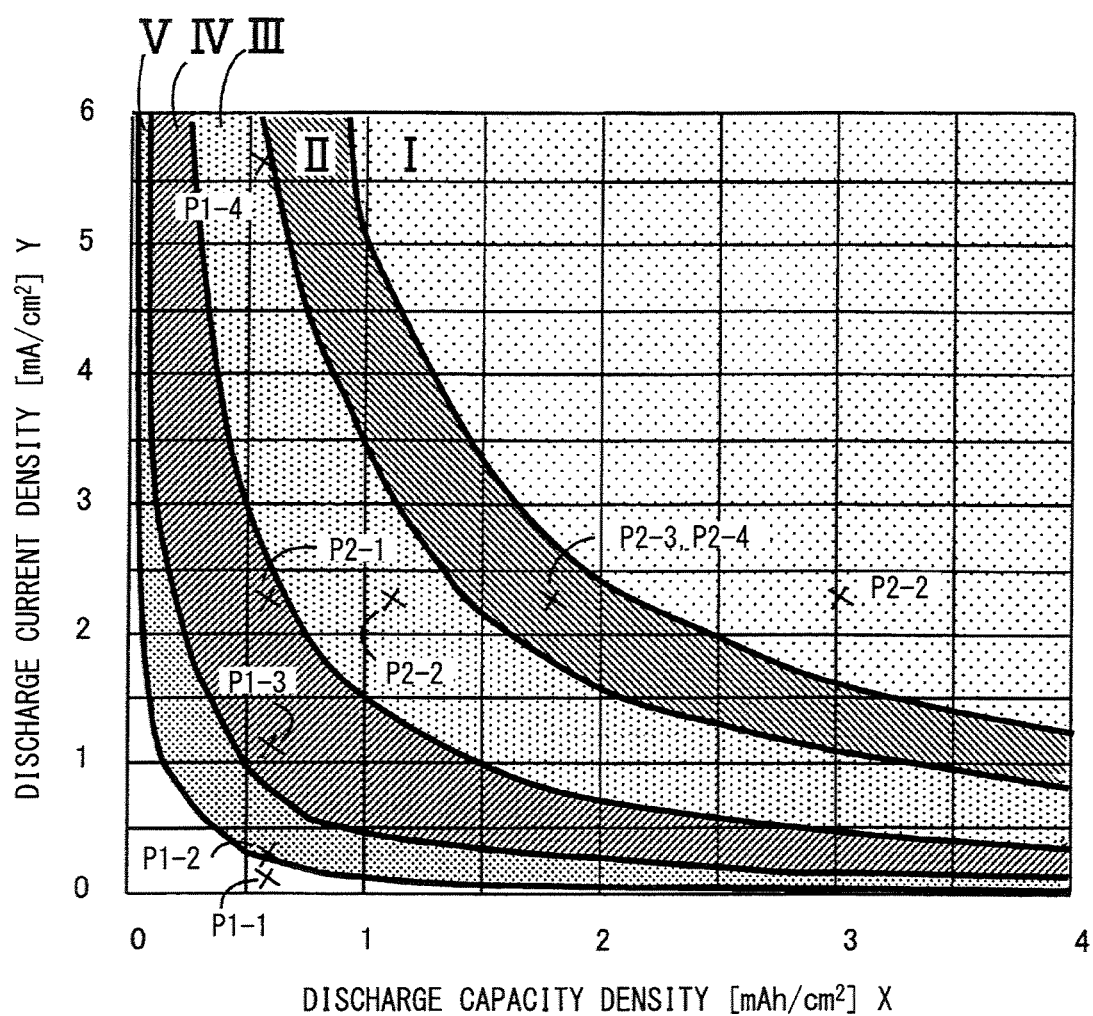
FIG. 5 is a graph simply illustrating a relation between a discharge current density and a discharge capacity density in an initializing discharge process.

A relation of the measured negative electrode impedance value (Z) to the discharge current density (Y) under a condition that the discharge capacity density is at a predetermined value and a relation of the measured negative electrode impedance value (Z) to the discharge capacity density (X) under a condition that the discharge current density is at a predetermined value can be determined. Graphs as shown in FIG. 3 and FIG. 4 can be obtained, for example, by performing an initializing discharge process experimentally. Further, a similar test is applied also for other predetermined values to obtain graphs and appropriate plots ((Y, Z), (X, Z)) are selected from the curves on the graphs. A graph, for example, as shown in FIG. 5 can be obtained for the outline of inverse proportion between the discharge capacity density (X) and the discharge current density (Y) in connection with the measured impedance value (Z). In FIG. 5, areas I, II, III, IV, and V show regions capable of regarding $Z \leq 200$ $\Omega cm^2$, $Z \leq 500$ $\Omega cm^2$, $Z \leq 1000$ $\Omega cm^2$, $Z \leq 2000$ $\Omega cm^2$, and $Z \leq 5000$ $\Omega cm^2$ respectively as standards so long as they are within the areas upper right to the boundary lines.

According to FIG. 5, when the battery has an intended discharge capacity density (2 mAh/cm²) that can be calculated based on the "discharge capacity corresponding to the amount of magnesium material", it can be estimated that a preferred negative electrode impedance ($Z \leq 500$ $\Omega cm^2$) can be obtained by setting a discharge current density (1.7 mA/cm²). Also for other desired discharge capacity density (X), it can be estimated to obtain the area: $Z \leq 500$ $\Omega cm^2$ so long as this is within the range of the region II that satisfies the relationship of: discharge capacity density (X)×discharge current density (Y)≥3.4. In substantially the same manner, when the battery has a desired discharge capacity density (X=1), a standard for the set value can be obtained for the discharge current density (Y=1.5) while ensuring a preferred negative electrode impedance ($Z \leq 1000$ $\Omega cm^2$) so long as this is within the range of the region III for (X)×(Y)≥1.5. Assuming that this is within the range of: (X)×(Y)≥1.3, a standard capable of realizing a practicable level of the overvoltage of the negative electrode can be obtained by decreasing the negative electrode impedance within a practically range of the capacity and the current.

It may be preferable that the negative electrode impedance be 1000 $\Omega cm^2$ or less just after the initializing discharge process. When the battery is charged/discharged, for example, at a current density of 1 mA/cm², the overvoltage of the negative, electrode is 1 V by virtue of simple calculation, so that a relation of: electromotive force>overvoltage of the negative electrode can be reliably obtained easily to ensure a practicable impedance.

In the initializing discharge process, it may be preferable to perform the discharging till the entire surface of the magnesium negative electrode becomes a bare surface.

When the negative electrode becomes the bare surface over the entire surface, since the entire surface of the original negative electrode is eluted, most of magnesium oxide can be defoliated and the negative electrode impedance can be decreased more reliably. For example, in FIG. 3 and FIG. 4, the measured value of the impedance is substantially at a lower limit value at about a predetermined level at a predetermined discharge current density or discharge capacity density or higher. It is considered, that when the impedance is at the lower limit value, the negative electrode is in a state where the original surface of the negative electrode is eluted and, instead, the bare surface is formed over the entire surface. Accordingly, it is considered that the impedance reaches a lower limit value because the magnesium monoxide is already defoliated and removed. Further, in FIG. 3 and FIG. 4, the lower limit value of the negative electrode impedance is different for the identical negative electrode material because difference is caused for the elusiveness of magnesium.

The surface of the negative electrode in which the bare surface is formed over the, entire, surface after the initializing discharge process can be shown, for example, by a SEM photograph in FIG. 2 taken in the example to be described later. Further, the cross section of the negative electrode in FIG. 2 can be shown by a SEM photograph in FIG. 10.

Figure 2:
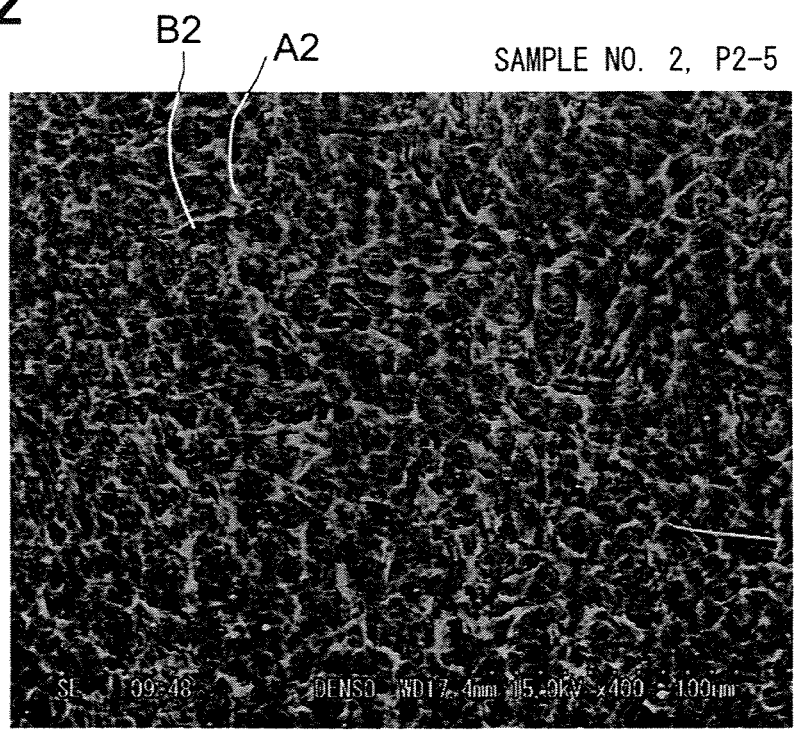
FIG. 2 is a SEM photograph of a bare surface formed over an entire surface of a negative electrode.
Figure 10:
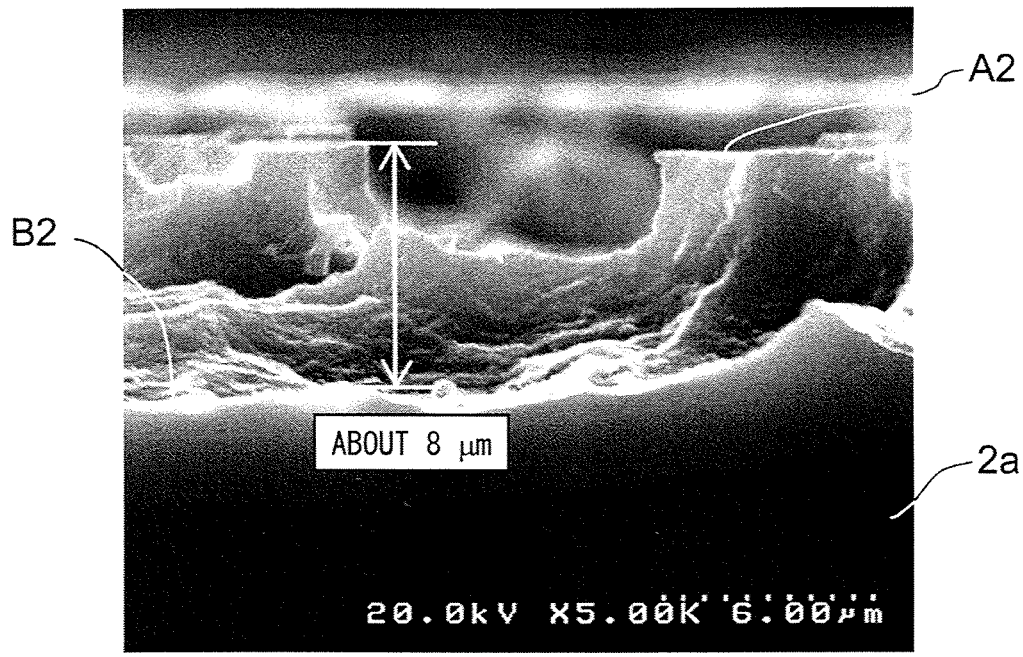
FIG. 10 is a SEM photograph for a cross section of a bare surface formed over an entire surface of a negative electrode.

As illustrated in FIG. 2 and FIG. 10, the bare surface exposed over the entire surface of the negative electrode has an uneven surface shape. A portion in FIG. 2 which is dark and extends entirely that occupies one-half or more of the area is a concave bare surface B2 having a somewhat deep concavity illustrated in FIG. 10. An indefinite somewhat whitish portion that extends patternwise in FIG. 2 is a shallow concave bare surface or a convex, bare surface A2 illustrated in FIG. 10. The convex bare surface A2 is a bare surface in which the negative electrode is eluted slightly while somewhat leaving the outer profile of the original flat surface. Accordingly, it is considered that the lower limit values of the negative electrode impedance are different respectively because the entire bare surface forms an uneven surface and, accordingly, the surface area is different depending on the respective negative electrodes.

In the initializing discharge process, it may be preferable to perform the discharging while continuing the state in which the magnesium secondary battery has been assembled and oxygen is further supplied in the battery system.

For example, as illustrated in FIG. 3 and FIG. 4, the negative electrode impedance can be decreased by performing the initializing discharge process. However, when the surface treatment is performed to the negative electrode by the initializing discharge process and then the battery is left as it is, the once decreased negative electrode impedance may possibly increase again. In this case, the negative electrode impedance increases till it is saturated at a predetermined upper limit value. A specific example can include an example of FIG. 6 illustrating a relation between the presence or absence of oxygen supply in the initializing discharge process performed in an evaluation test of the example to be described later and the saturated upper limit value of the negative electrode impedance.

Figure 6:
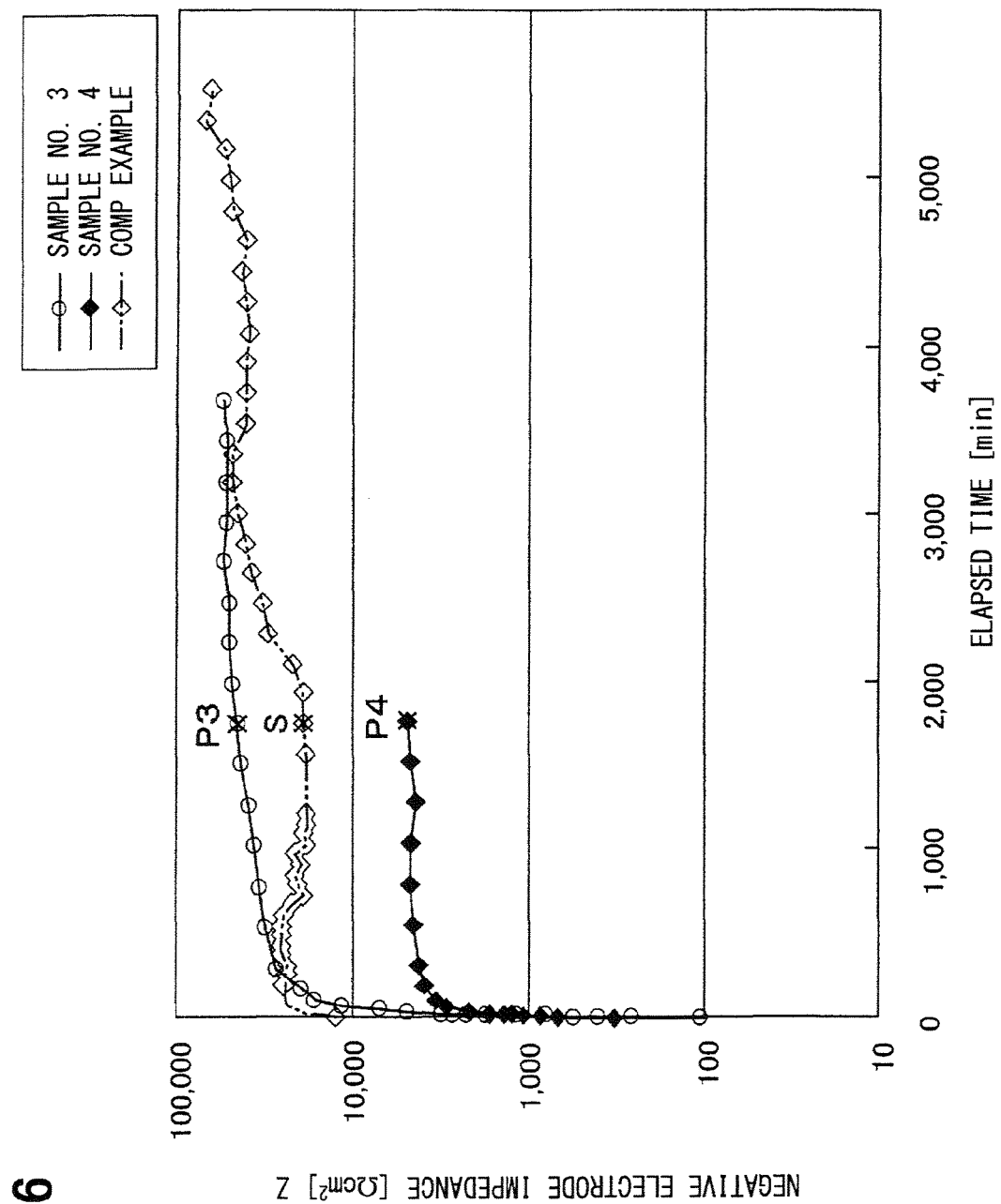
FIG. 6, is a graph illustrating a relation between a presence or absence of an initializing discharge process, a presence or absence of oxygen supply, and a saturation upper limit value of a negative electrode impedance.

As shown by a sample No. 4 in FIG. 6, the saturation upper limit value of the negative electrode impedance can be decreased more than that in a sample No. 3 with no oxygen supply by performing the initializing discharge process while supplying oxygen. This is a result of a test of performing the surface treatment to the negative electrode only by the initializing discharge process without the charge process.

It is considered that the saturation upper limit value is decreased because oxygen supplied in the battery system hinders the reaction of forming the high impedance compound again at the bare surface where the negative electrode is exposed. The high impedance compound that is formed again in this case is not always identical with magnesium monoxide formed at the negative electrode before the discharging.

The method of supplying oxygen, etc. is not particularly limited. For example, a method of supplying an oxygen gas in an ion conductor or a method of supplying oxygen by way of the negative electrode may also be used. A method of forming the positive electrode as an air electrode, to be described later and supplying oxygen by way of the air electrode may be preferred.

(Charge Process)

The charge process according to this embodiment is a process of performing charging after performing the initializing discharge process to form the bare surface at the surface of the negative electrode, thereby forming a magnesium layer so as to cover the bare surface. The additional magnesium layer formed so as to cover the bare surface after the discharging hinders re-formation of the high impedance compound. Accordingly, succeeding to the decrease of the negative electrode impedance by the initializing discharge process, increase of the electrode impedance can be suppressed.

Accordingly, it may be preferable to perform the charge process just after the initializing discharge process. If the battery is left for a while without charging after the initializing discharge process, the high impedance compound may be possibly formed again at the negative electrode. For example, this includes a case where the oxide formed by reaction with oxygen in the atmosphere is formed or precipitated to the bare surface formed in the initializing discharge process. The charge process performed just after the initializing discharge process means to apply the charging while maintaining a state where the re-formation of the high impedance compound does not proceed. That is, "just after the initializing discharge process" does not mean a real elapsed time between the initializing discharge process and the charge process. Thus, re-formation of the high impedance compound can be minimized and increase of the negative electrode impedance can be suppressed.

Further, since the bare surface is an uneven surface, the magnesium layer covering the bare surface is inevitably formed in an uneven shape. Accordingly, since the effective surface area of the negative electrode can be increased, the negative electrode impedance can be decreased further.

The effect of suppressing the increase of the negative electrode impedance is kept also in a case of leaving the battery after performing the charge process. The graph, in FIG. 7 illustrates an example of a result where the saturation upper limit value of the negative electrode impedance is evaluated in the example to be described later.

Figure 7:
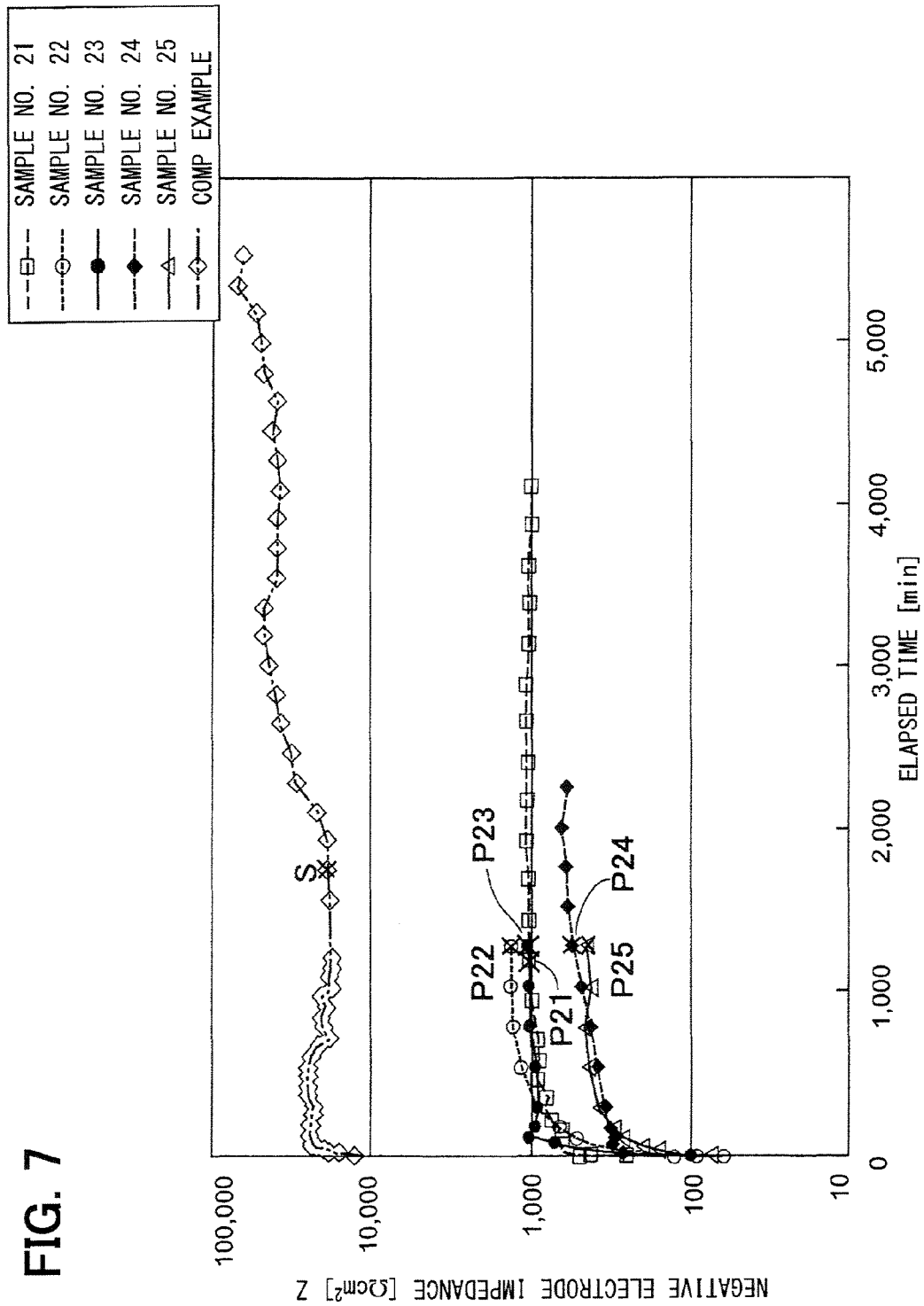
FIG. 7 is a graph illustrating a relation between a presence or absence of an initializing discharge process and a charge process, a presence or absence of oxygen supply, and a saturation upper limit value of a negative electrode impedance.

As illustrated in FIG. 7, while the negative electrode impedance increases somewhat after completing the charge process, increase of the negative electrode impedance is saturated to show an upper limit value after a predetermined time. The saturation upper limit value of the negative electrode impedance in samples Nos. 21 to 25 in which the charge process is performed according to this embodiment is decreased remarkably when compared with the negative electrode impedance of a comparative example in which the battery is left as it is just after assembling with no surface treatment to the negative electrode.

It may be preferable to perform the charge process in a state where oxygen is further supplied in the battery system. In the sample No. 24 and the sample No. 25 in which oxygen is supplied, the saturation upper limit value of the negative electrode impedance can be decreased further than in the samples Nos. 21 to 23 in which the charge process is performed without supply of oxygen. In this case, a method of supplying oxygen only in the charge process without supplying oxygen in the initializing discharge process may also be used. Also in this method (sample No. 25), the saturation upper limit value of the negative electrode impedance can be decreased more than that in the case of not supplying oxygen (samples Nos. 21 to 23).

Further, by performing the discharge process of discharging the battery by a capacity identical with the discharge capacity in the initialize discharge, conduction species (magnesium ions or magnesium) can be restored to the state before the discharging without localizing them (to positive electrode or negative electrode) compared with the case of performing only discharging. For example, if magnesium or a magnesium oxide precipitated by the discharging to the positive electrode remains on the positive electrode even after the charge process, this may undesirably lower the potential difference between the positive electrode and the negative electrode and increase the positive electrode impedance. In order to avoid such disadvantage, it may be preferable to perform the charge process such that the charged capacity in the charge process is identical with the discharge capacity from the view point of localization of the conduction species.

Further, the charge process can be performed at a charge capacity density less than the discharge capacity density in the initializing discharge process. For example, the initializing discharge process is performed at predetermined discharge capacity densities different from each other under a condition that the value of the discharge current density is at a constant level and respective negative electrode impedances are measured. Subsequently, the charge process is performed at each of the charge capacity densities which is identical with each of the discharge capacity densities under a condition that the charge current density is at a constant level identical with the discharge current density, and the negative electrode impedance is measured again. After performing the initializing discharge process and after performing the charge process thereafter, a test result that the negative electrode impedance after the charge process is decreased by a predetermined value irrespective of each of the discharge/charge capacity densities can be obtained (for example, the impedance was decreased by about 180 $\Omega cm^2$ in the examples of samples Nos. 26 (P26) and 27 (P27) in FIG. 8). Accordingly, decrease of the negative electrode impedance by the charge process can be obtained about by the identical value irrespective of the discharge capacity density. Further, a satisfactory standard can be obtained also for the charge current density and the charge capacity density in the charge process and the negative electrode impedance after the charge process by backward calculation based on the value of the condition during the discharging with reference to FIG. 5 used upon explanation of the initializing, discharge process. For example, the negative electrode impedance just after the charge process may be, preferably, 100 $\Omega cm^2$ or less.

Figure 9:
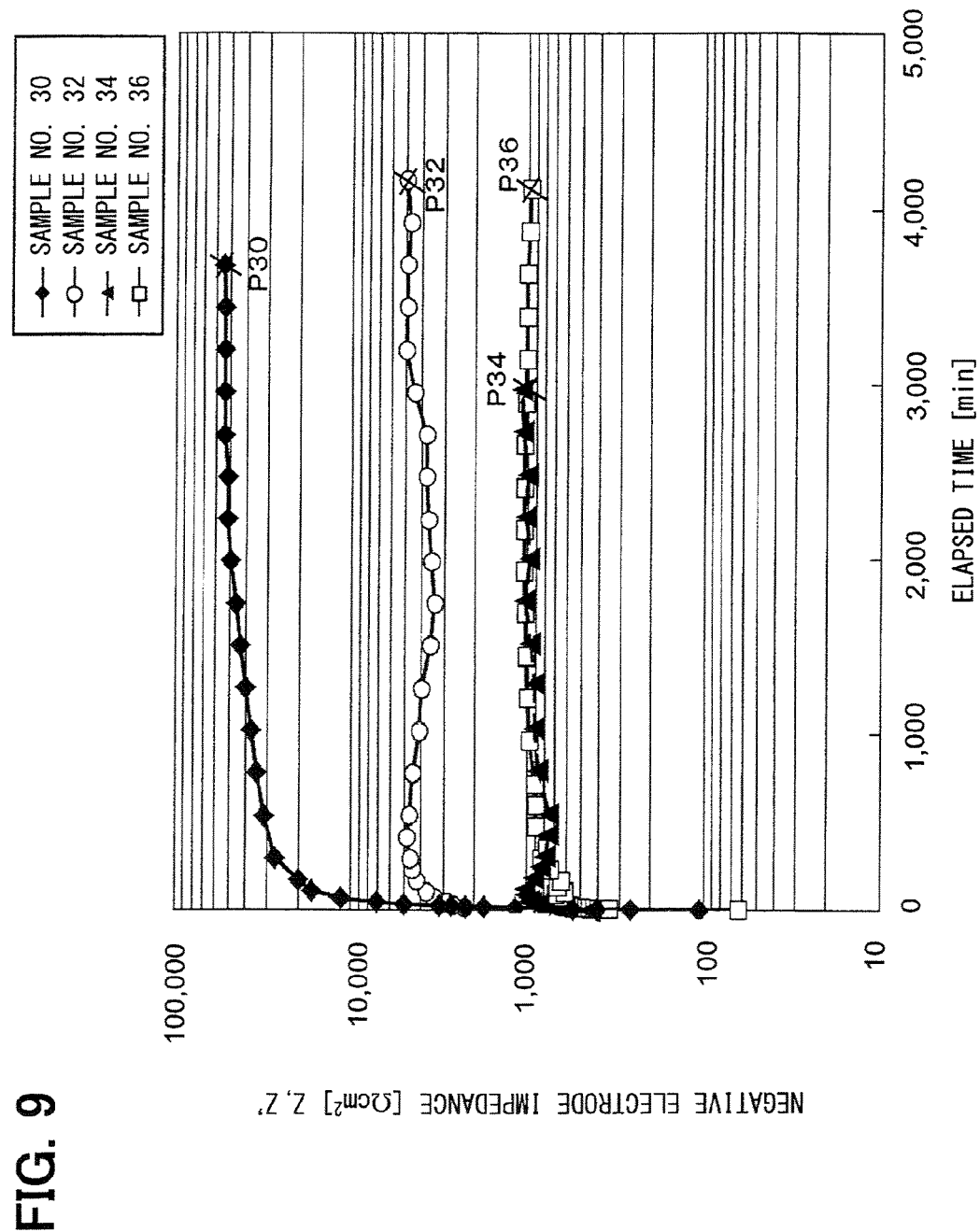
FIG. 9 is a graph illustrating a relation between a charge current density and a saturation upper limit value of a negative electrode impedance.

Further, an appropriate charge current density upon performing the charge process was selected. A relation of the measured value of the negative electrode impedance to the charge current density was confirmed under the condition that the value of the charge capacity density is at a constant level. The result performing the charge process experimentally in the examples to be described below is illustrated in the graph of FIG. 9. In FIG. 9, samples Nos. 32, 34, and 36 are samples applied with the charge process respectively at a charge current density of 028, 0.57, and 2.26 $mA/cm^2$. Sample No. 30 is a sample applied only with the initializing discharge process without performing the charge process.

It was found from FIG. 9 that the amount of decreasing the saturation upper limit value of the negative electrode impedance can be ensured greatly by performing the charge process at a higher charge current density till the charge current density reaches a predetermined level. Further, it was found that the effect of decreasing the saturation upper limit value of the negative electrode impedance is saturated at a charge current density exceeding a predetermined level. It may be preferable to perform the charge process at a charge current density of 0.25 $mA/cm^2$ or higher or 0.28 $mA/cm^2$ or higher since the saturation upper limit value of the negative electrode impedance can be decreased reliably. Further, it may be preferable to perform the charge process at a charge current density of 0.5 $mA/cm^2$ or higher or 0.57 $mA/cm^2$ or higher since the amount of decreasing the saturation upper limit value of the negative electrode impedance can be ensured to an utmost level. Further, when the saturation upper limit value of the negative electrode impedance is identical, it may be preferable that the charge current density be as low as possible. Higher charge current density means higher overvoltage of the electrode. Accordingly, it may be preferable that the charging be performed at a charge current density of about 03 mA/cm² to 037 in the charge process.

Further, it may be preferable that the density of the magnesium layer be lower than that of the negative electrode. For example, when the gap between particles that define the magnesium layer is larger than the bare surface to provide a "low density" state, the effective surface area of the negative electrode is larger by so much as the gap. That is, the effective surface area of the negative electrode having the magnesium layer is larger than the effective surface area of the negative electrode consisting only of the bare surface, and the negative electrode impedance can be decreased.

Further, it may be preferable to form the magnesium layer on the negative electrode surface at a thickness larger than the thickness that can be calculated based on the discharge capacity.

As illustrated in a SEM photograph for a bare surface in FIG. 10, an uneven bare surface is formed by elution of magnesium at the surface of the negative electrode and the concave bare surface B2 has a depth, for example, of 8 µm. In the initializing discharge process, the discharging is performed till the bare surface is formed over the entire surface of the negative electrode and the discharge capacity density is 1.8 mAh/cm². When the numbers of eluted charge particles which are determined by dividing the discharge capacity density based on the unit of second converted from hour h by the quantum of electricity ($1.6 \times 10^{-19}$ coulomb) are divided by the valence number 2 of the magnesium ion, the amount of magnesium eluted from the surface of the negative electrode can be calculated. Then, considering the surface area of the original negative electrode, etc., a hypothetical average depth due to elution of magnesium can be determined when a hypothetical bare surface which is flat over the entire surface is formed. The inventors of the present application actually performed calculation for the magnesium negative electrode shown in the SEM photograph of FIG. 10 to determine the calculated value of 4 µm as a hypothetical average depth of the bare surface. The actual bare surface is an uneven surface and the inventors consider that there is no serious inconsistency that the concave bare surface B2 was actually measured as 8 µm which is deeper than the hypothetical average depth (4 µm).

When the charge process is performed at an identical charge capacity, the hypothetical average depth corresponds to a hypothetical average layer thickness of the magnesium layer to be precipitated. The negative electrode surface in which the magnesium layer is formed over the entire surface after the charge process is illustrated in a SEM photograph of FIG. 11 which was taken in the example to be described later. The thickness T of the magnesium layer M that can be actually measured in view of the SEM photograph of FIG. 11 was 40 µm, which was ten times as large as the hypothetical average thickness.

Figure 11:
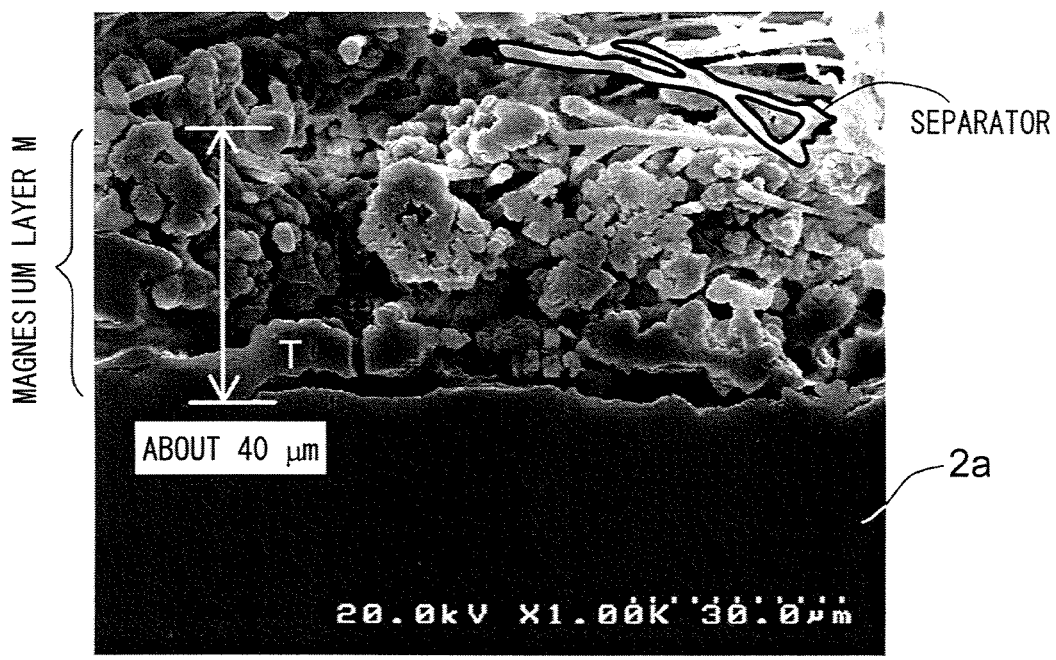
FIG. 11 is a SEM photograph for a cross section of a magnesium layer.

The portion of the magnesium layer M formed at the surface of the negative electrode in FIG. 11 is in a state of a lower density and in a porous state having a number of voids as illustrated in the photograph compared with the magnesium negative electrode in FIG. 10 in which the bare surface is exposed. That is, the surface area of the negative electrode having the magnesium layer M formed by the charge process is increased outstandingly by so much as the voids compared not only with the surface of the negative electrode just after the assembling but also with the bare surface after the discharging. Accordingly, it is considered that since the reaction sites are increased by the increase of the effective surface area of the negative electrode and the amount of reaction material at the surface of the electrode can be increased, the negative electrode impedance is decreased outstandingly and the overvoltage of the negative electrode can be suppressed to a practicable level.

Figure 12:
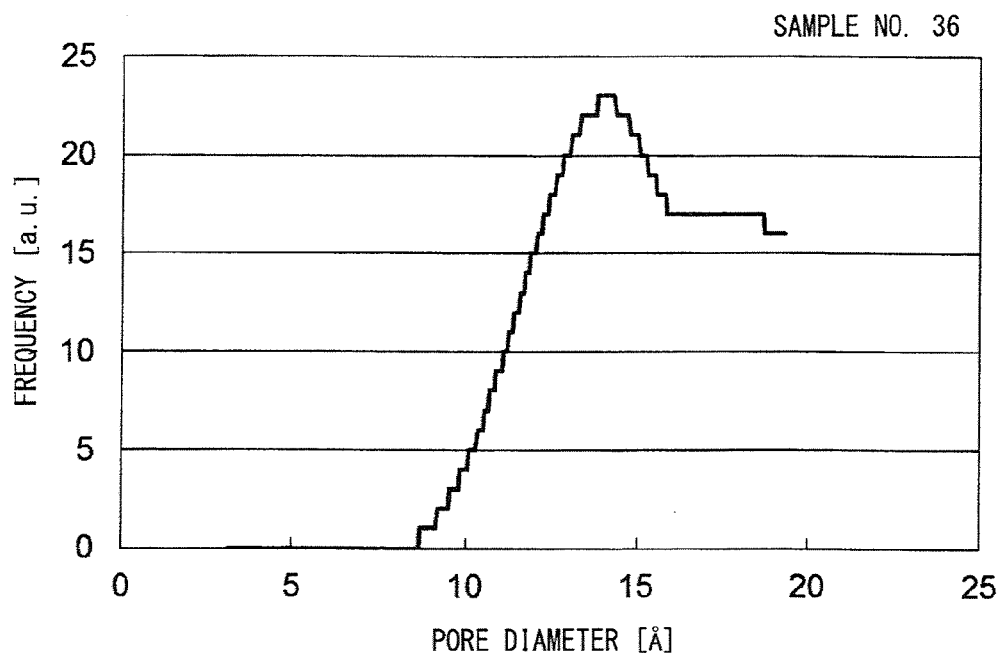
FIG. 12 is a graph illustrating a pore diameter distribution of voids in a magnesium layer.
Figure 13:
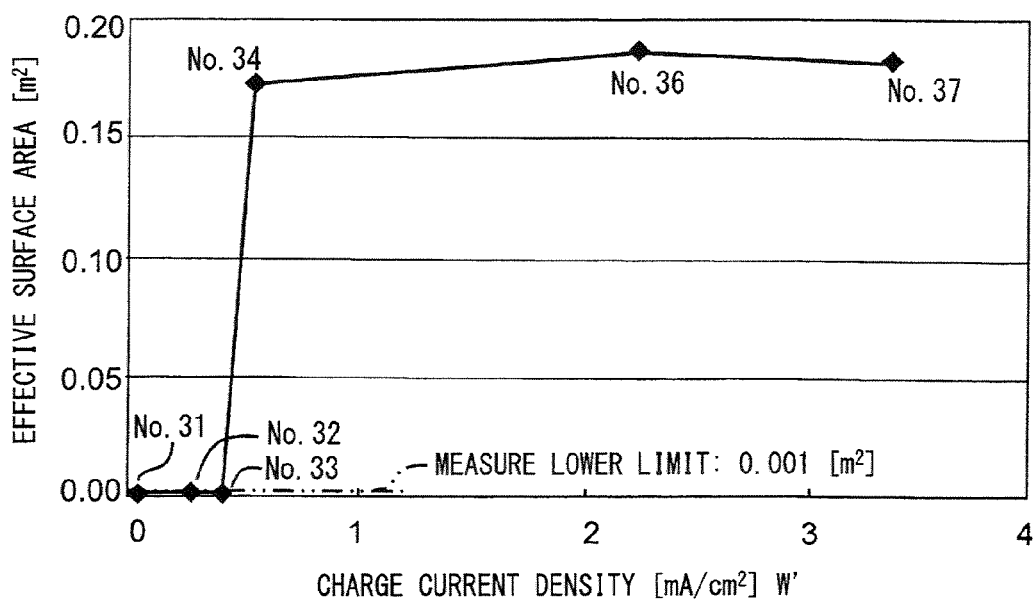
FIG. 13 is a graph illustrating a relation between a charge current density and an effective surface area of a magnesium layer.
Figure 14A:
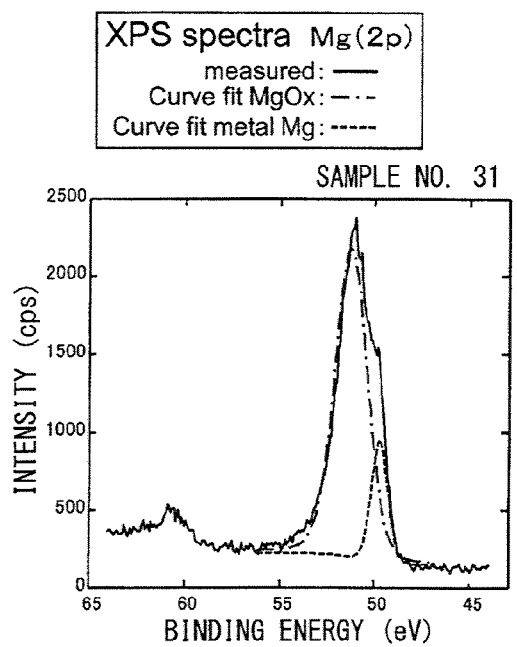
FIGS. 14A to 14F are diagrams illustrating spectra of XPS analysis on magnesium layers, which illustrate a result of measurement showing magnesium spectra.
Figure 14B:
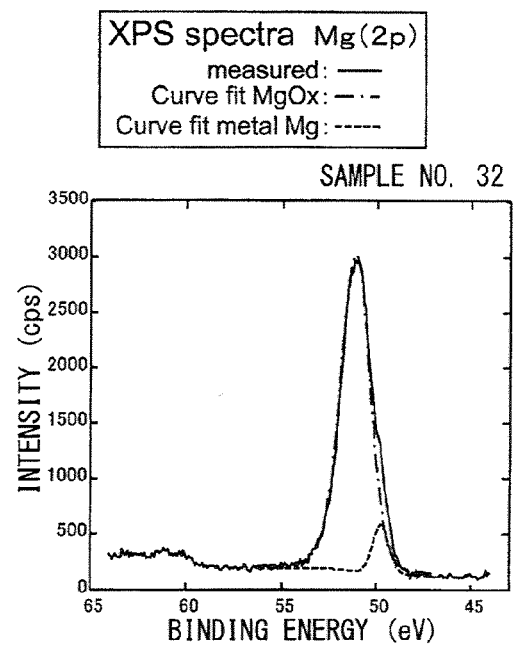
Figure 14C:
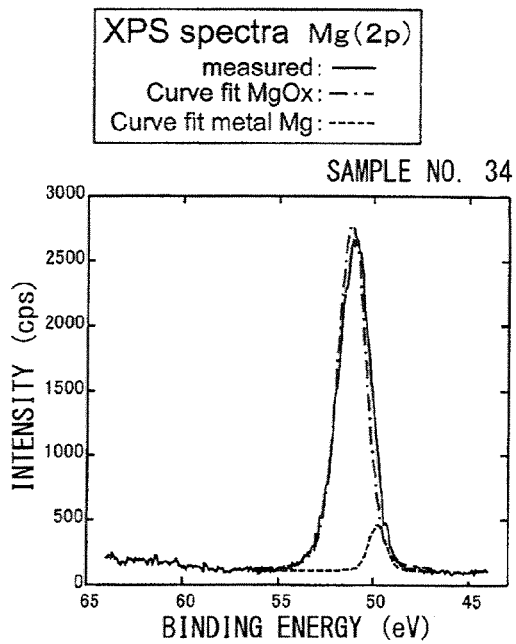
Figure 14D:
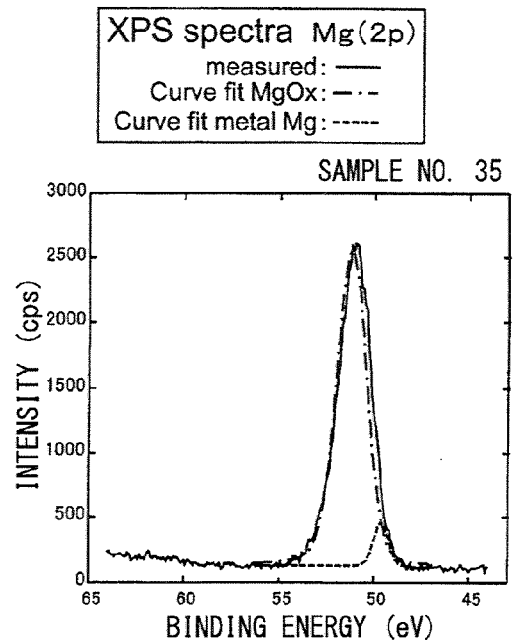
Figure 14E:
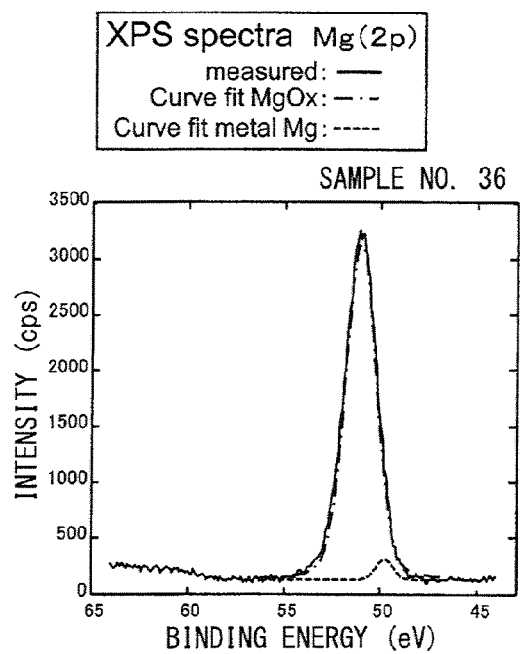
Figure 14F:
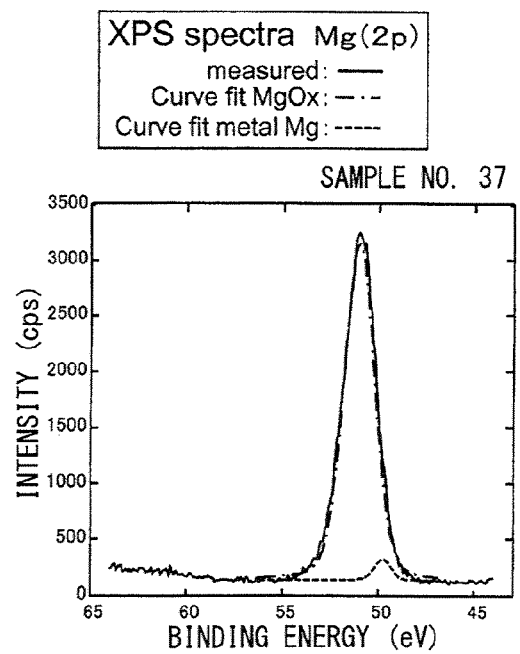
Figure 15A:
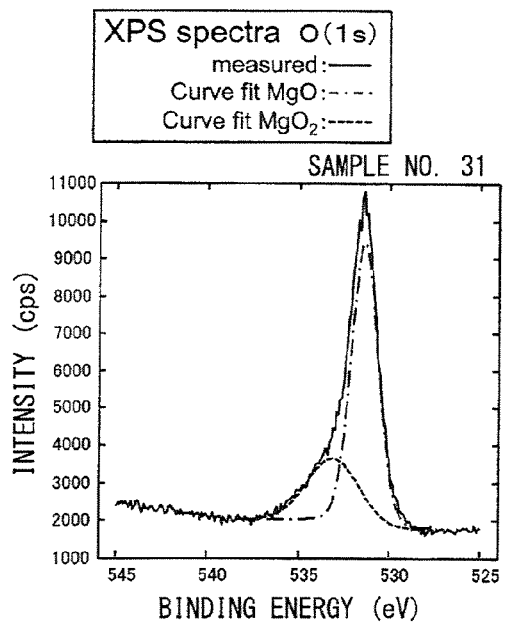
FIGS. 15A to 15F are diagrams, illustrating a result of measurement showing oxygen spectrum.
Figure 15B:
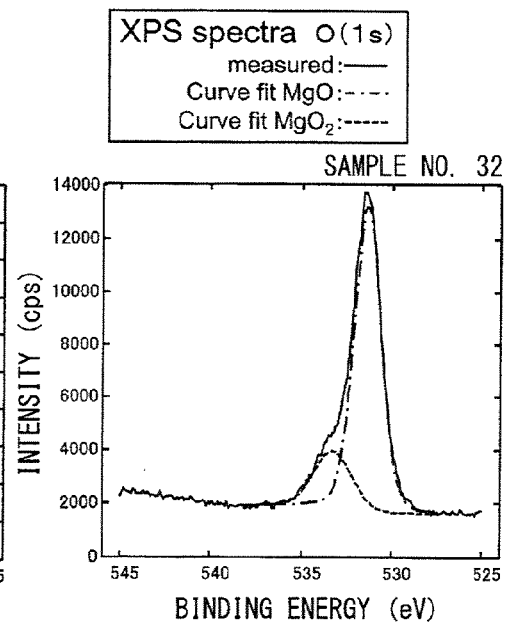
Figure 15C:
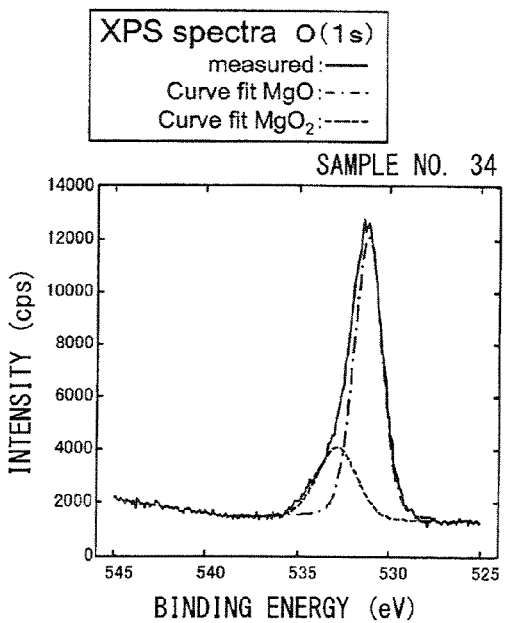
Figure 15D:
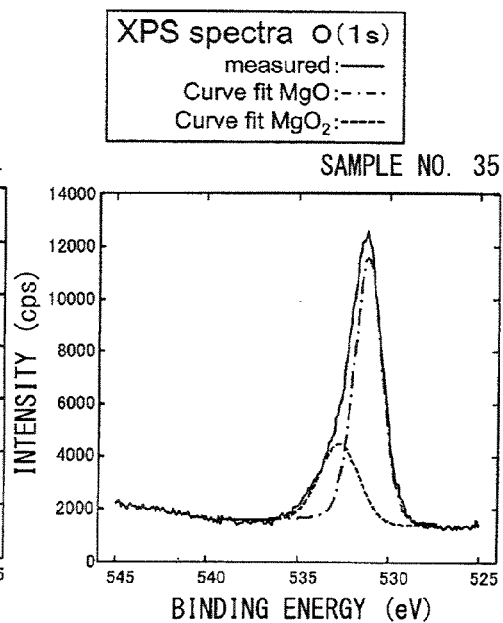
Figure 15E:
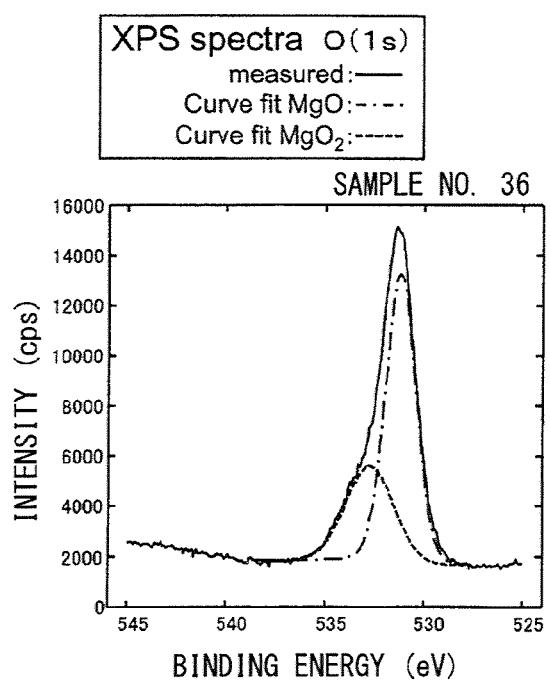
Figure 15F:
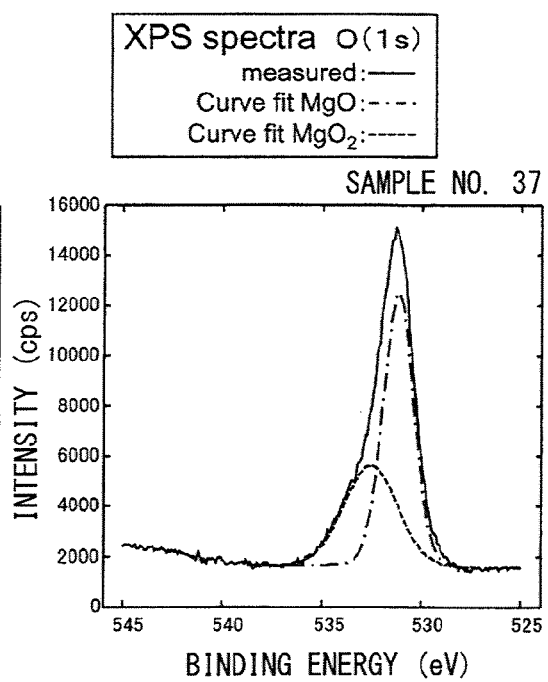

The graph of FIG. 12 illustrates the result of measuring the pore diameter distribution of voids in the precipitated magnesium layer for a sample No. 36 according to the example to be described later. The sample No. 36 shows a satisfactory amount of decreasing the saturation upper limit value of the negative electrode impedance by the charge process. The graph of FIG. 13 illustrates the result of measuring the effective surface area of the magnesium layer also for the sample No. 36.

As illustrated in the graph, the porous magnesium layer has voids which are distributed between about 8.8 Å and 20 Å, and the magnesium layer showing such void distribution has an effective surface area of about 0.18 m². Based on a projection area of the electrode of the sample, the area increment of the effective surface area at about 0.18 m² reaches as much as 3500 times of ratio (refer to FIG. 23). Accordingly, it may be preferable that the porous magnesium layer described above have voids of pore diameters distributed between 10 Å to 20 Å. Since the effective surface area of the magnesium layer precipitated at the surface of the negative electrode is increased outstandingly, the effective surface area of the negative electrode is also increased outstandingly and, in other words, the negative electrode impedance can be decreased outstandingly.

FIGS. 14A to 14F and FIGS. 15A to 15F illustrate the result of XPS analysis on the magnesium layer of the samples No. 31, 32, 34, 35, 36, 37. FIG. 14A to FIG. 14F show magnesium spectra of magnesium layers. It can be seen from the spectra in FIG. 14A to FIG. 14F that the porous magnesium layer contains magnesium oxide ($MgO_x$) and elemental magnesium as compositional ingredients. Further, FIG. 15A to FIG. 15F show oxygen spectra of the magnesium layers. It can be seen from the spectra of FIG. 15A to FIG. 15F that the in-layer magnesium oxide of the porous sample contains magnesium monoxide (MgO) and magnesium peroxide ($MgO_2$) as the compositional ingredient.

Accordingly, it may be preferable that the magnesium layer contain elemental magnesium and a magnesium oxide and the magnesium oxide in the magnesium layer contain magnesium peroxide and magnesium monoxide.

Further, a composition of the magnesium element and the oxygen element in the magnesium layer was determined in view of the spectra of FIGS. 14A to 14F and FIGS. 15A to 15F. It was found that the composition of the magnesium element: oxygen element in the porous magnesium layers of the sample No. 36 is about 48:52.

Figure 16:
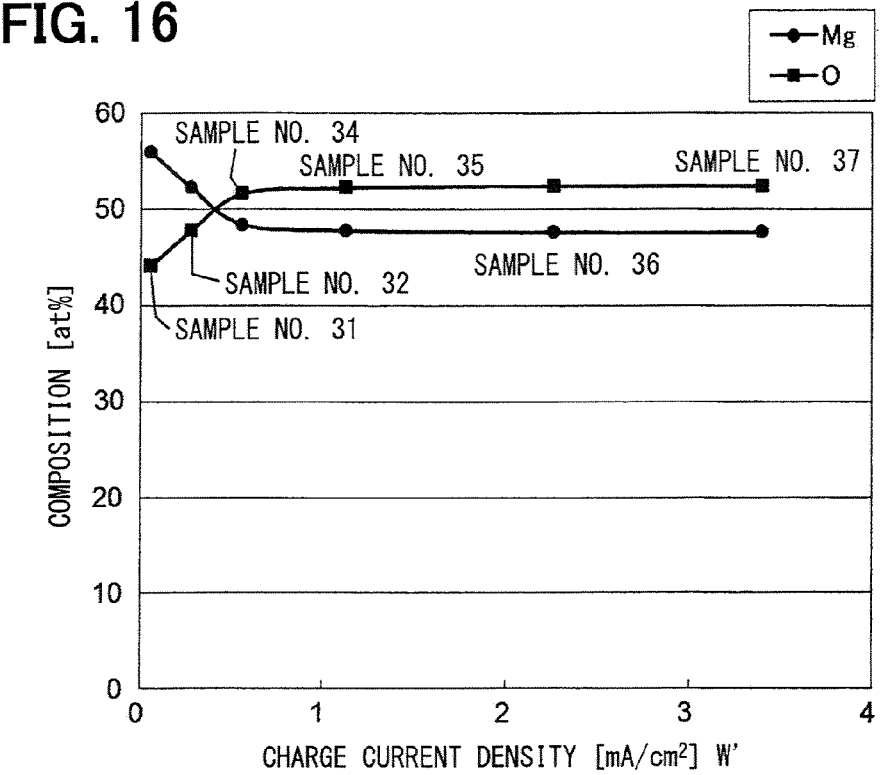
FIG. 16 is a graph illustrating a relation between a charge current, density and a composition of magnesium and oxygen in a magnesium layer.

Further, as illustrated in FIG. 16, a relation between the charge current density in the charge process and the compositional ratio of the magnesium element and the oxygen element in the magnesium layer was confirmed. Further, as illustrated in FIG. 13, a relation between the charge current density during the charge process and the effective surface area of the magnesium layer was confirmed.

As illustrated in the graphs, it can be seen that when the compositional ratio of the oxygen element to the magnesium element in the magnesium layer exceeds 52, the effective surface area of the magnesium layer increases outstandingly. It can be seen that the charge current density in this case is 0.57 mA/cm².

Specifically, when the charge current density in the charge process is low (for example, 0.42 mA/cm² or lower in FIG. 13), voids are less formed in the magnesium layer. For forming the porous voids showing the pore diameter distribution illustrated in FIG. 12, it is advantageous to apply the charging at a high charge current density. On the other hand, in view of FIG. 16, it is recognized that the charge current density increases during the charge process, the compositional ratio of the oxygen element in the magnesium layer tends to be higher than that of the magnesium element. The oxygen element composition is derived from the formation of magnesium oxide, that is, magnesium monoxide and magnesium peroxide.

The inventors of the present application consider that as the charge current density in the charge process is higher, formation of the in-layer magnesium oxide proceeds more. Then, formation of the in-layer magnesium oxide results in voids at the pore diameter distribution described above in the magnesium layer and the magnesium layer is precipitated in the porous form. That is, the effective surface area of the magnesium layer is increased due to the formation of the magnesium oxide to increase the reaction sites at the surface of the negative electrode. Accordingly, the negative electrode impedance can be decreased. Further, since the porous magnesium layer inhibits the formation of the high impedance compound, the saturation upper limit value of the negative electrode impedance can be decreased.

However, since the electric resistivity of the magnesium oxide per se is high, if the charge current density in the charge process increases and the compositional ratio of the oxide increases excessively, the impedance may be increased. Further, if the charge current density increases excessively, this may not be preferred since the loss of electromotive force is increased in each of the elements of the battery. Even when the charge current density increases, increase of the effective surface area in the magnesium layer and increase of the compositional ratio of the oxygen element in the magnesium layer (to magnesium element) are saturated to certain values. In view of the foregoings, the inventors of the present application consider that the charge process is performed preferably at a charge current density of 0.5 mA/cm² or higher.

Figure 17:
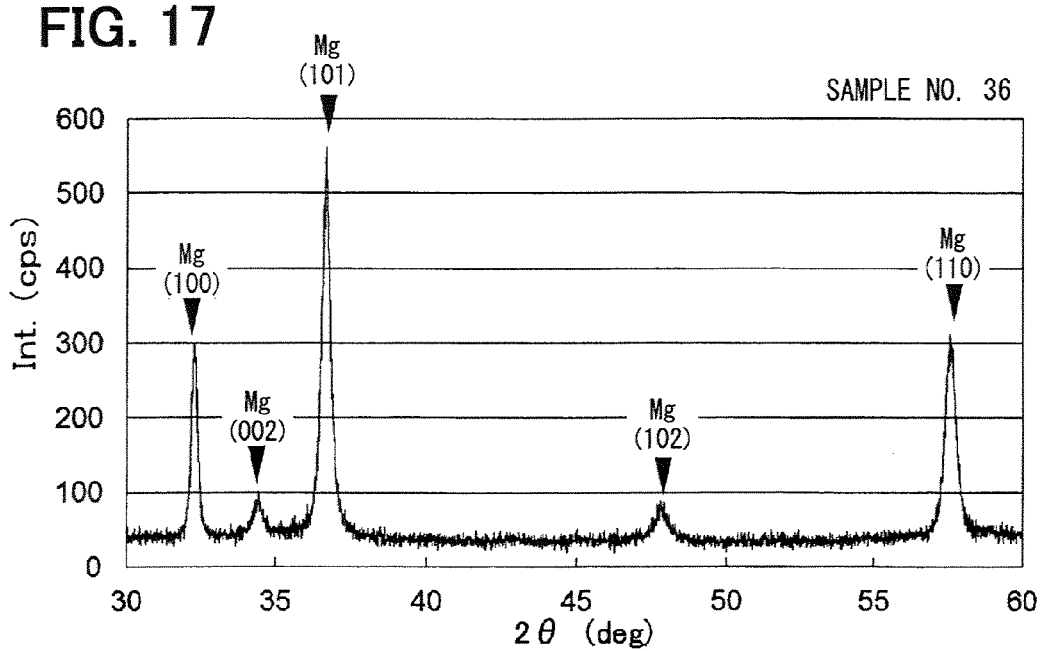
FIG. 17 is a graph illustrating a result of X-ray diffraction on a magnesium layer.

Further, magnesium oxide in the magnesium layer may be preferably amorphous. FIG. 17 also illustrates the result of analyzing the magnesium layer of the sample No. 36 by XRD. As illustrated in the graph, it was found that the ingredient having the crystallinity in the magnesium layer is only the elemental magnesium and the magnesium oxide containing the magnesium monoxide and magnesium peroxide is in an amorphous state.

The magnesium layer according to the embodiment of the present disclosure repeats elution or precipitation at each of the electrodes in accordance with the discharging or the charging. Since magnesium oxide is precipitated in an easily decomposable amorphous state. The magnesium layer can be eluted more easily. That is, since the elution resistance of the magnesium layer can be suppressed, this can contribute to the decrease of the negative electrode impedance.

<<Negative Electrode>>

The above-described surface treatment is applied to the negative electrode for the magnesium secondary battery according to the embodiment of the present. Other structures than this can be similar to those of a known negative electrode. Specifically, the negative electrode according to the embodiment of the present disclosure can be obtained by performing the above-described surface treatment method. The negative electrode of this embodiment will be described.

The negative electrode according to this embodiment is a negative electrode capable of releasing magnesium ions during discharge and capable of precipitating elemental magnesium during charging.

For the negative electrode active material, known materials can be used with no particular restriction. For example, materials comprising magnesium-based metals such as magnesium alloys or elemental magnesium can be used suitably for the negative electrode. It may be preferable that elemental magnesium be used particularly.

The magnesium alloy, generally means magnesium-containing alloys. Preferred examples may include magnesium alloys of highest magnesium content and it may be alloys containing two or more other elements in addition to magnesium. They may include, more preferably, those alloys containing magnesium by 50% or more by mass ratio and, particularly preferably, those alloys containing magnesium by 90% or more by mass ratio based on the entire 100 mass % of the magnesium alloy.

Auxiliary ingredients contained in the magnesium alloy are not particularly limited and can include, for example, aluminum, zinc, manganese, silicon, calcium, iron, copper, and nickel.

Further, the negative electrode or the negative electrode active material may also be other compounds of the magnesium-based metals so long as they can release magnesium ions during discharge and precipitate elemental magnesium during charging. Alternatively, such materials may be used in combination.

The negative electrode may also have an active material layer containing a conductive material, a binder, etc. in addition to the negative electrode active material. For example, when the negative electrode active material is powdery, it may be an active material layer containing a negative electrode active material and a binder. Further, when the negative electrode active material is in a foil shape, the material may be an active material layer consisting only of the negative electrode active material.

Further, when the negative electrode active material has a powdery active material layer, the negative electrode can be formed, for example, by coating a mix that forms the same to a collector. The collector is not particularly limited so long as the collector has conductivity, and foils, meshes, etc. comprising copper, stainless steel, titanium, or nickel, which may be known, can be used.

It may be preferable that the negative electrode according to this embodiment is applied with the surface treatment according to the embodiment of the present disclosure. Further, it may be preferable that the magnesium layer formed on the surface of the negative electrode is at a density lower than that of the negative electrode. It may be more preferable that the layer is formed on the surface of the negative electrode at a thickness larger than the thickness that can be calculated based on the discharge capacity density and, further preferably, has fine voids distributed in a range of 10 Å to 20 Å. Further, it may be preferable that the magnesium layer contains oxygen in the composition of the magnesium layer and, more preferably, contains magnesium and magnesium oxide. It may be preferable that the magnesium oxide in the magnesium layer comprises magnesium peroxide ($MgO_2$) and magnesium monoxide ($MgO$) and is more preferably, in an amorphous state.

<<Magnesium Secondary Battery>>

The magnesium secondary battery according to the embodiment of the present disclosure includes the negative electrode applied with the surface treatment according to the above-described embodiment of the present disclosure. Other elements than those described above may be substantially identical with those of a known magnesium secondary battery. Specifically, the magnesium secondary battery according to the embodiment of the present disclosure is a battery having the negative electrode according to the embodiment described above. The magnesium secondary battery according to this embodiment is to be described.

The magnesium secondary battery according to this embodiment has the negative electrode, a positive electrode capable of precipitating the magnesium oxide during discharging and capable of releasing magnesium ions during charging, and a non-aqueous ion conductor that conducts magnesium ions as conduction species.

(Positive Electrode)

The positive electrode in the magnesium secondary battery of this embodiment is not particularly limited so long as the positive electrode can precipitate the magnesium oxide during discharging and can release magnesium ions during charging.

It may be preferable that the positive electrode is formed as an air electrode having an oxygen gas as a positive electrode active material. Further, it may be preferable that an oxidation catalyst or an oxidizer that promotes formation of the magnesium oxide is provided and the oxidation catalyst can be used particularly. For example, a catalyst layer containing such oxidation catalyst, etc. can be provided to the collector of positive electrode but this configuration is not limited.

Specifically, the air electrode (positive electrode) can be formed by providing a gas chamber capable of intaking an external oxygen gas such as atmospheric air in adjacent to the positive electrode collector provided with the catalyst layer. In this configuration, the gas chamber may be provided being adjacent to the collector by way of a gas diffusion layer for diffusing the oxygen gas in the catalyst layer. The oxygen gas is not limited to the oxygen gas in the external atmosphere but may also be an oxygen gas at a high concentration filled by a predetermined method. Further, pure oxygen gas can be used suitably.

The oxidation catalyst can include compounds, for example, manganese peroxide, oxides of transition metals such as cobalt, manganese, or iron, inorganic compounds containing platinum group metals such as nickel, palladium and platinum, noble metal oxides, metal-coordinated organic compounds, and compounds such as peroxides. Among them, manganese peroxide can be used suitably.

The place where the oxidation catalyst is provided is not limited particularly to the positive electrode. The oxidation catalyst may be provided, for example, to two places of, i.e., the positive electrode and the negative electrode, or may be provided in the non-aqueous ion conductor. It may be preferable that the oxidation catalyst is provided to the positive electrode.

It may be preferable that the catalyst layer contains at least an oxidation catalyst. Further, with a view point of taking place electrochemical reaction more smoothly, it may be preferable that the oxidation catalyst per se or the catalyst layer has high conductivity. For this purpose, it may be preferable that a conductive material or a binder for binding the same is added to the oxidation catalyst to form a catalyst layer.

The conductive material is not particularly limited so long as the material has electroconductivity and includes, for example, carbon material and metal powder. The carbon material includes specifically, graphite, acetylene black, ketjen black, carbon black, carbon fiber, etc.

The binder includes, for example, polyvinylidene fluoride (PVDF), polytetrafluoro ethylene (PTFE), fluoro resin copolymer (tetrafluoro ethylene-hexafluoro ethylene copolymer), and rubber type resin such as EPDM, styrene butadiene rubber and nitrile butadiene rubber.

The catalyst layer can be prepared by coating a slurrified oxidation catalyst mix on one or both surfaces of a collector and drying the same. The catalyst layer may be compressed by pressing or the like after drying. The oxidation catalyst mix can be prepared by suspending and mixing an oxidation catalyst in the form of a powder, granule, or short fiber and, if necessary, conducting agent, binder, etc. in an appropriate solvent. For the solvent, an organic solvent such as N-methyl-2-pyrrolidone can be used with no particular restriction thereto.

The gas diffusion layer has a function of diffusing the oxygen gas taken from the gas chamber in the catalyst layer during discharge reaction and diffusing the generated oxygen gas into the gas chamber during charge reaction. For the gas diffusion layer, a porous conductive sheet comprising carbon or the like can be used suitably and the gas diffusion layer specifically includes, for example, carbon paper, carbon cloth, and carbon felt.

The collector collects current by electrochemical reaction. The material for the collector is not particularly limited so long as it has electroconductivity and, for example, nickel, gold, stainless steel, platinum, aluminum, and titanium can be used. The shape of the collector includes, for example, foil, plate, or mesh, and the mesh can be used suitably for ensuring the diffusion of the oxygen gas.

According to this embodiment, energy density per volume can be increased by forming an air electrode using an oxygen gas as the positive electrode active material. Therefore, the magnesium secondary battery according to this embodiment can be practiced suitably as a magnesium air secondary battery.

(Non-Aqueous Magnesium Ion Conductor)

The non-aqueous magnesium ion conductor of the magnesium secondary battery according to this embodiment is not particularly limited so long as it is a non-aqueous ion conductor that conducts magnesium ions as conductive species. It may preferable that the non-aqueous magnesium ion conductor is a non-aqueous electrolyte interposed between the positive electrode and the negative electrode and conducting magnesium ions between the positive and the negative electrodes.

The non-aqueous electrolyte is not particularly limited so long as the electrolyte can form a path when the magnesium ions transfer from the positive (negative) electrode to the negative (positive) electrode, for which known electrolytes can be used. The electrolyte includes, for example, a solution in which a supporting electrolyte is dissolved in a solvent, an ionic liquid which is a liquid per se, and a solution in which the supporting electrolyte is dissolved further to the ionic liquid. "Electrolyte" referred to in the present specification includes not only liquid supporting electrolytes but also known solid or gelled supporting electrolytes. It may preferable that non-aqueous electrolytes comprising non-aqueous organic solvent containing magnesium salts can be used.

As the organic solvent, one or more of customary non-aqueous electrolytes can be used in combination. For example, cyclic or chained ester, chained or cyclic ether, cyclic or chained polycarbonate, or a mixed solvents thereof which are used in existent non-aqueous electrolyte secondary batteries can be used.

Specifically, the chained ether compound includes diethylene glycol dimethyl ether, etc., the cyclic ether compound includes tetrahydrofurane, etc., the cyclic carbonate compound includes ethylene carbonate, propylene carbonate, etc., and the chained polycarbonate compound includes dimethyl carbonate, diethyl carbonate, etc. It may preferable that the non-aqueous organic solvent is a solvent having high solubility for oxygen with the view point of using the dissolved oxygen efficiently for the reaction.

In the battery of this embodiment, known supporting electrolytes can be used as the supporting electrolyte. For example, magnesium chloride ($MgCl_2$), magnesium perchlorate ($Mg(Cl_4)_2$), magnesium bis(trifluoromethyl sulfonyl)imide ($Mg[N(CF_3SO_2)_2]$), magnesium trifluoromethane sulfonate ($Mg(CF_3SO_3)_2$), and magnesium fluorobutane sulfonate ($MgC_4F_9SO_3)_2$) can be used.

The ionic liquid is not particularly limited so long as it is an ionic liquid used for non-aqueous electrolyte in usual secondary batteries. For example, the cationic ingredient includes highly conductive 1-methyl-3-ethylimidazolium cation and diethyl methyl methoxy ammonium cation. The anionic ingredient includes, for example, $BF_4^-$ and $(SO_2C_2F_5)_2N^-$.

The magnesium secondary battery of this embodiment comprises the elements described above (positive electrode, negative electrode, non-aqueous magnesium ion conductor) and, in addition, other optional elements. For example, a separator can be used for electrically insulating the positive electrode and the negative electrode and retaining the non-aqueous electrolyte. For ensuring insulation between the positive electrode and the negative electrode, It may preferable that a separator of a larger dimension than the positive electrode and the negative electrode is used. Further, when the positive electrode and the negative electrode are housed in the battery vessel, a separator may be used as a member for preventing the contact between the battery vessel and each of the electrodes.

As the separator, a porous synthetic resin film, porous film of polyolefinic polymer (polyethylene, polypropylene, etc.), non-woven fabrics such as non-woven resin fabric and non-woven glass fiber fabric can be used with no particular restriction. The non-woven glass fiber fabric can be used suitably.

For the magnesium secondary battery of this embodiment, the positive electrode has been explained as it is formed as an air electrode. However, the method of supplying oxygen as the active material according to this embodiment is not limited to the method of forming the air electrode. The positive electrode is not particularly limited so long as it can precipitate magnesium oxide during discharging and can release magnesium ions during charging and other configuration in which a predetermined positive electrode containing an active material is provided to the positive electrode collector may also be used. For example, the positive electrode active material may be provided to the collector by incorporating the positive electrode active material in the non-aqueous magnesium ion conductor. Further, the positive electrode active material is not always limited to oxygen but a known configuration of the positive electrode in which an active material layer containing a predetermined positive electrode active material is provided to the collector may also be used.

The shape of the magnesium secondary battery is not particularly limited and can be used as a battery of various shapes such as a coin type, a cylindrical type, a square type. etc. Further, also the battery vessel is not limited and the battery can be used in various forms using, for example, a vessel made of metal, resin or the like that can retain the outer profile and a soft and flexible vessel such as a laminate pack. Further, the battery vessel provided with the air electrode may be an open to atmospheric type or tightly closed type.

(Manufacturing Method)

A magnesium secondary battery of the embodiment is not limited by a method of manufacturing the magnesium secondary battery and can be manufactured by a manufacturing method similar to a known method of manufacturing the non-aqueous electrolyte secondary batteries. For example, the manufacturing method includes: forming the positive electrode and the negative electrode described above; then housing an electrode assembly formed by stacking them by way of a separator into a battery vessel; and then injecting a non-aqueous magnesium ion conductor.

<<Example>>

Embodiments will be more specifically described with reference to examples. As an example of a magnesium secondary battery according to the present disclosure, magnesium batteries Ba and Bb each having a three electrode cell Ca or Cb were manufactured. The following example shows a configuration of a specific embodiment of the present disclosure but embodiments of the present disclosure are not limited to the following example.

<<Magnesium Secondary Battery>>

<Magnesium Battery Ba>

(Negative Electrode)

A thin flat disk of elemental magnesium (manufactured by Nilaco Co., purity 3N) having 15 mm diameter and 0.1 mm thickness was used as a negative electrode.

(Positive Electrode Collector Having with Catalyst Layer)

A catalyst sheet was prepared as a catalyst layer. The catalyst sheet was prepared by kneading 20 mass parts of an oxidation catalyst for promoting formation of magnesium oxide, 70 mass parts of a conductive material, and 10 mass parts of a binder in a dry process by using a mortar. The oxidation catalyst comprises fine particles of manganese peroxide (FMH, manufactured by Toso Co.). The conductive material comprises ketjen black (KB-ECP600JD, manufactured by Ketjen International Co., Ltd.). The binder comprised a PTFE powder (D-2C, manufactured by Daikin Industry Co.). Then, the catalyst sheet (4 mg) was press bonded to a positive electrode collector comprising a circular nickel mesh (manufactured by Nilaco Co.).

(Preparation of Non-Aqueous Electrolyte)

A non-aqueous organic solvent was prepared. 15 vol % of tetrahydrofuran and 85 vol % of diethylene glycol dimethyl ether were mixed so as to provide 100% entire volume of the non-aqueous organic solvent. Then, a non-aqueous electrolyte was prepared by adding a supporting electrolyte to the non-aqueous organic solvent. The supporting electrolyte comprised $Mg[PhBCl(OEt_3)]$. The anion complex comprised ethoxy-chloro-phenyl-complex of boron having a structure having boron situated at the center, and ethoxy ($C_2H_5O^-$), chloride ($Cl^-$), and phenyl ($C_6H_5^-$) ligands coordinated thereto. Specifically, magnesium chloride was added such that the concentration of magnesium cations was 0.3 mol/L and, further, the anion complex described above was added.

(Separator)

As a separator, non-woven fabric of glass fibers of 21 mm diameter and 210 μm thickness (GA-55, manufactured by TOYO Co.) was used. The separator electrically insulated the positive electrode and the negative electrode and retained the electrolyte.

(Assembling of Three Electrode Cell)

Figure 18:
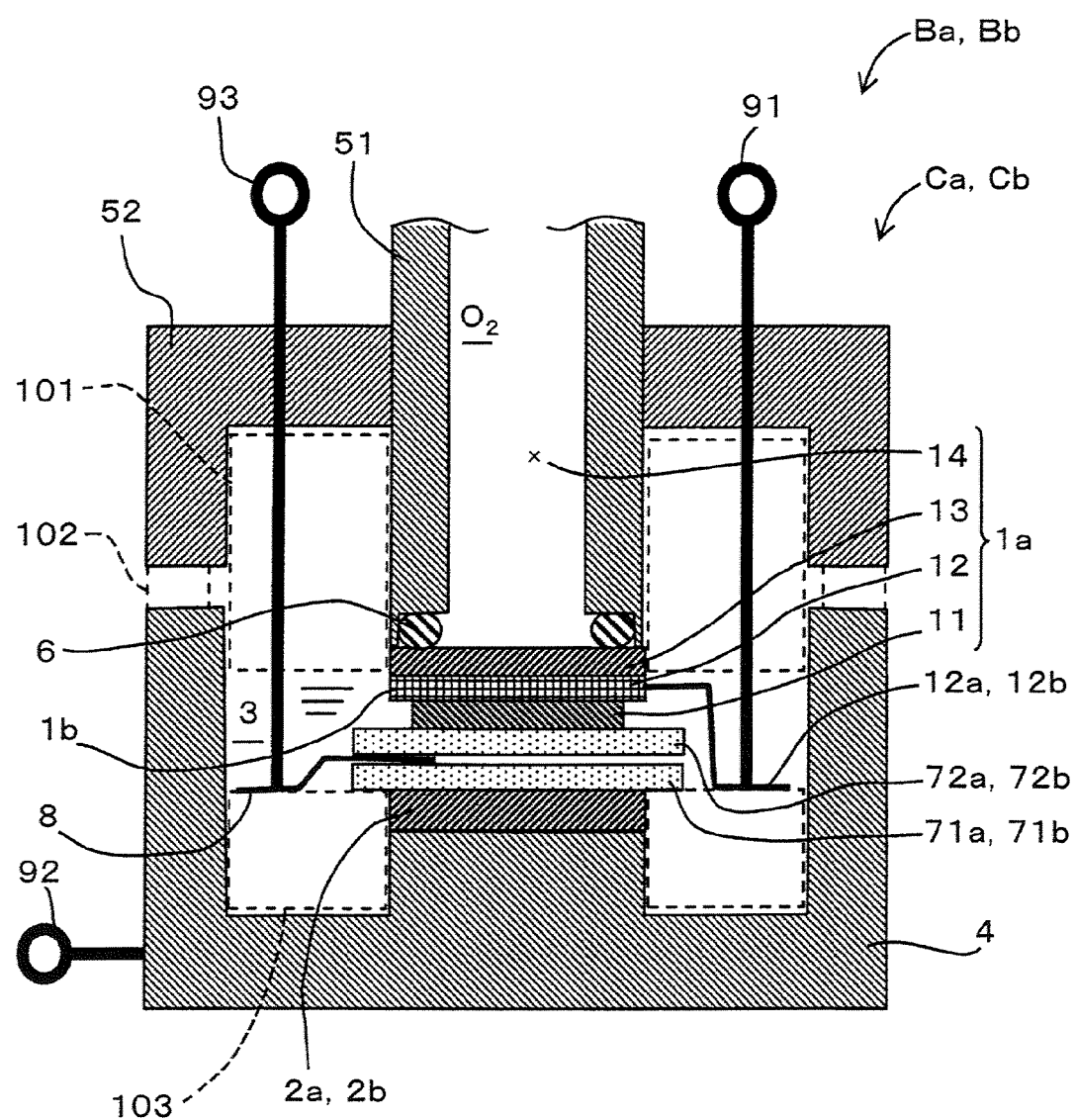
FIG. 18 is a cross sectional view illustrating an outline of arrangement and configuration of each of elements of a magnesium secondary battery.
Figure 19:
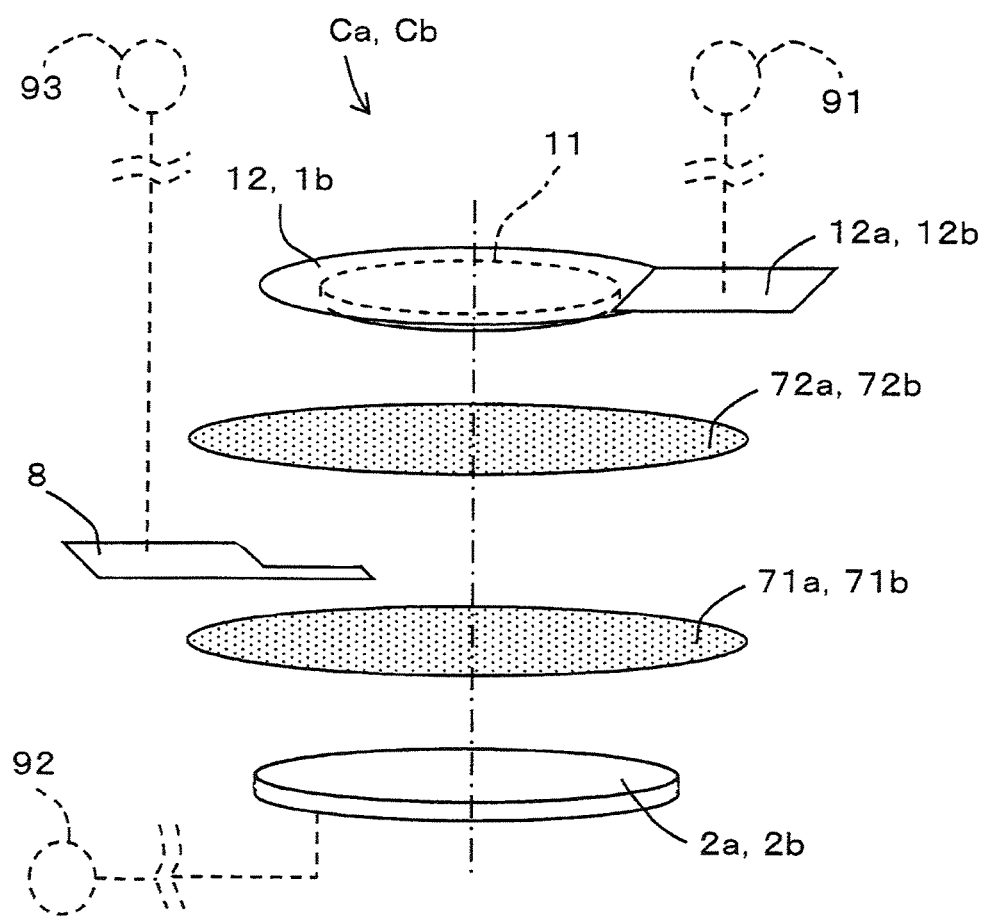
FIG. 19 is a view schematically illustrating arrangement and configuration of main elements of a three electrode cell.
Figure 20:
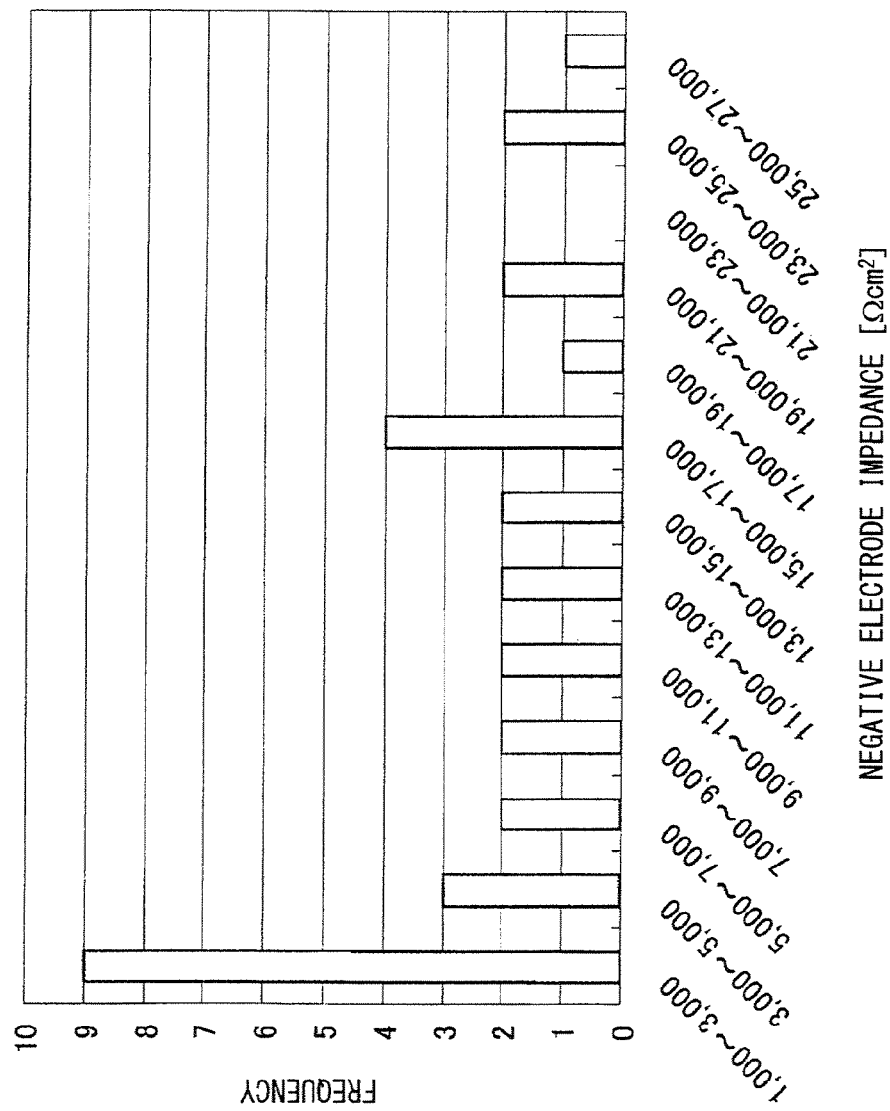
FIG. 20 is a histogram of a negative electrode impedance just after assembling a magnesium secondary battery.

A three electrode cell Ca schematically illustrated in FIG. 19 was assembled by the following procedures using a positive electrode (positive electrode collector), a negative electrode, and a non-aqueous electrolyte, etc. to manufacture a magnesium battery Ba illustrated in FIG. 18.

At first, both surfaces of a negative electrode 2a was polished by the edge of a glass plate in a globe box under an argon atmosphere to remove oxide (magnesium oxide) formed at the surface. The negative electrode 2a was dissolved inside a lower casing 4 made of stainless steel.

Then, a separator 71a was disposed over the negative electrode 2a to cover the entire negative electrode 2a. Then, a reference electrode 8 was disposed over the separator 71a to lay a projection for a portion of the reference electrode 8 over the negative electrode 2. Then, another separator 72a identical with the separator 71a was disposed over the reference electrode 8. Further, the collector 12 of the positive electrode is set over the separator 72a, and the surface of the collector 12 of the positive electrode provided with the catalyst sheet 11 was disposed so as to oppose the negative electrode 2a by way of the separator 72a, the reference electrode 8, and the separator 71a. Then, a prepared non-aqueous electrolyte 3 was injected between the collector 12 of the positive electrode and the negative electrode 2a.

As a gas diffusion source, carbon paper 13 (EC-TP1-H090T, manufactured by Toray Co.) was used. The carbon paper 13 was placed over the collector 12 of the positive electrode. An upper casing 51 had a hollow cylindrical shape and was formed of stainless steel. The upper casing 51 was placed and mounted over the carbon paper 13 by way of a sealing ring 6. Then, the inner peripheral surface of a second upper casing 52 was fitted to the outer peripheral surface of the first upper casing 51, and the second upper casing 52 was assembled. Then, the second upper casing 52 was assembled to the lower casing 4 by a not illustrated clamping jig to fix the three electrode cell Ca and manufacture a magnesium battery Ba.

A pure oxygen gas was filled in a gas chamber 14 disposed in a hollow portion inside of the first upper casing 51 and then the gas chamber 14 was tightly closed. The positive electrode is was an air electrode formed by a collector 12 having the catalyst sheet 11, the carbon paper 13 covering the upper surface of the collector 12, and the pure oxygen gas in the gas chamber 14 in contact with the collector 12 by way of the carbon paper 13.

A positive electrode terminal 91 was in electric conduction with the positive electrode is by way of a nickel mesh of the collector 12 of the positive electrode and a nickel ribbon 12a welded thereto. The positive electrode terminal 91 and a reference electrode terminal 93 in electric conduction with the reference electrode 8 were provided in a state insulated from the second upper casing 52. Further, a negative electrode terminal 92 in electric conduction with the negative electrode 2a was provided in a state insulated from the lower casing 4. In FIG. 18 references 101, 103 denote terminal supports and 102 denotes a casing support.

<Magnesium Battery Bb>

(Negative Electrode)

As a negative electrode, a elemental magnesium foil (MG-273328, at 99.9% purity (plate thickness 0.1 mm), manufactured by Nilaco Co.) was used and punched into 15 mm diameter by a pinch used an exclusively therefor.

(Positive Electrode)

As a positive electrode, a gold foil (AU-173244, at 99.95% purity (plate thickness 0.03 mm), manufactured by Nilaco Co.) was used and punched into 15 mm diameter by a pinch used an exclusively therefor.

(Preparation of Non-Aqueous Electrolyte)

A non-aqueous electrolyte identical with that of the magnesium battery Ba was used. That is, the electrolyte was prepared by adding a supporting electrolyte identical with that of the magnesium battery Ba to a non-aqueous organic solvent identical with that of the magnesium battery Ba in the same manner.

(Separator)

As a separator, a ring made of PTFE having an outer diameter of 15.0 mm and an inner diameter of 8.0 mm, and thickness of 1.0 mm was used.

(Assembling of Three Electrode Cell)

A magnesium battery Bb was manufactured by assembling a three electrode cell Cb using the positive electrode, the negative electrode, and the non-aqueous electrolyte described above. Description is to be made mainly for the difference from the magnesium battery Ba described above with reference to FIG. 18 and FIG. 19. In FIG. 18 and FIG. 19, members of the magnesium battery Bb identical with those used in the magnesium battery Ba carry same reference numerals.

The three electrode cell Cb is different from the three electrode cell Ca mainly in that a positive electrode 1b made of a gold material was used as the positive electrode and ring-shaped separators 71b, 72b made of a PTFE material was used. Further, as a counter electrode in electric conduction with the positive electrode 1b, a gold mesh punched into 15 mm diameter (AU-178100, manufactured by Nilaco Co.) and a gold ribbon cut into 4 mm width and 50 mm length (AU-173244, manufactured by Nilaco Co.) were used. The counter electrode carrying a reference sign 12b and is illustrated schematically in FIG. 19. As a reference electrode 8, a magnesium electrode (Mg ribbon (MG-270610, at 99.9% purity), manufactured by Nilaco Co.) was used. A three electrode cell Cb in which each of other members identical with those of the three electrode cell Ca was used and arranged in the same manner was assembled to the lower casing 4 and each of the first and the second upper casings 51, 52.

The magnesium material used for the negative electrode 2b and the reference electrode 8 was polished at the surface by a glass edge just before assembling the three electrode cell Cb. The gold foil used for the positive electrode 1b and the gold mesh and the gold ribbon used for the counter electrode 12b were cleaned by the following procedures. That is, they were supersonically washed with ethanol for 30 minutes, cleaned with distilled water, supersonically cleaned with 0.1N hydrochloric acid for 30 minutes, cleaned with distilled water, and then dried in an oven at 60° C. and then transferred by way of a passage box to the inside of a globe box.

The three electrode cell Cb was assembled in a globe box (MDB-2B, manufactured by Miwa Seisakusho Co.) in an argon atmosphere at a dew point of −80° C. and a residual oxygen concentration of 0.2 ppm. The magnesium battery Bb was manufactured by assembling the three electrode cell Cb using other members identical with those of the magnesium battery Ba.

<<Evaluation of Battery>>
(Example)

For performing a test under a predetermined condition to be described later, samples shown in FIGS. 21 to 23 were provided. Discharge capacity density: X (discharge capacity per unit area), charge capacity density: U, discharge current density: Y (current per unit area), charge current density: W were set by the following procedures described above. Further, the impedance of the electrode was measured by the following procedures. The surface of the negative electrode was observed under SEM by the following procedures. Further, the surface of the magnesium layer was analyzed under the following conditions described above.

The magnesium battery Ba and the magnesium battery Bb applied with the surface treatment were evaluated by applying (i. initializing discharge process) to the samples in FIG. 21 and by applying (ii. initializing discharge process and charge process) to the samples in FIG. 22. For the samples in FIG. 23, the magnesium battery Bb having (iii. magnesium layer) formed by the surface treatment according to the embodiment of the present disclosure was evaluated. Numerical values of the impedance which are attached with the symbol "*", underlined, and indicated by bold-faced type in FIGS. 21 to 23 show numerical values as saturation upper limit value of the negative electrode impedance to be described later.

(Measuring Procedures for Impedance)

A measuring system having an electrochemical interface (SI1287), and an impedance/gain-phase analyzer (SI-1260) manufactured by Solartron Co. was used. WE and RE2 terminals of the system were connected to the negative electrode terminal 92, a RE1 terminal was connected to the reference electrode terminal 93, and a CE terminal was connected to the positive electrode terminal 91 of the three electrode cell Ca or Cb. Impedance between the negative electrode and the reference electrode was determined by fitting an impedance curve obtained by fixing an AC amplitude to 20 mV and sweeping the frequency from 100 kHz to 0.1 Hz.

(Discharge Procedures)

For discharging, a measuring system having an electrochemical interface (SI1287) and an impedance/gain-phase analyzer (SI-1200) manufactured by Solartron Co. was used. The WE and RE2 terminals were connected to the negative electrode terminal 92, the RE1 terminal was connected to the reference electrode terminal 93, and the CE terminal was connected to the positive electrode terminal 91 of the three electrode cell C and discharging at a constant current was performed.

(Charge Procedure)

In charging, charging at a constant current was performed in a direction opposite to that in discharge by using the same measuring system as that for the discharge procedures and in accordance with the same procedures as those in discharge while inversing the polarity.

(SEM Observation for Negative Electrode Surface)

After the discharging under the predetermined condition, the magnesium battery Ba was disassembled to take out the negative electrode. After cleaning with tetrahydrofuran and drying in a glow box, the negative electrode was set to a scanning electrode microscope manufactured by Hitachi High Technologies Corporation (S-3000N) and the surface of the sample was irradiated with an electron beam under an acceleration voltage of 15 keV, to observe secondary electron images.

(Analysis for the Surface of Magnesium Layer)

Specific surface area meter AUTOSORB-1, manufactured by Quantachrome Instruments was used for the measurement of the pore distribution of fine voids in a magnesium layer and for the measurement of the effective surface area of the magnesium layer. Further, for the XPS analysis (X-ray photoelectron scopy) for the magnesium layer ESCA5400MC X-ray photoelectlectron spectroscopy manufactured by ULVAC-PHI Co. was used. Kα-lines of magnesium atoms were used as a X-ray source.

(Comparative Example)

For performing a test under a predetermined condition to be described later, discharge capacity density: X and discharge current density: Y were set and the negative electrode impedance: Z was measured by the same procedures as described above.

<i Initializing Discharge Process>

(1. Discharge Current Density: Y and Negative Electrode Impedance: Z)

Dependence of the negative electrode impedance on the discharge current density was confirmed. The discharge capacity density: X was set to a constant level of 0.604 mAh/cm$^2$, the discharge current density: Y was changed from 113.2×10$^{-3}$ mA/cm$^2$ to 5.66 mA/cm$^2$, and the negative electrode impedance: Z was measured at a predetermined discharge current density: Y within the range. The test result for sample No. 1 is shown in FIG. 3. P1-1 to P1-4 in FIG. 3 are plots corresponding to the sample No. 1. Specific numeral values for each of the plots P1-1 to P1-4 are shown in the Table 1 described above.

It can be seen from FIG. 3 that the negative electrode impedance decreases monotonously along with increase in the discharge current density within a range where the discharge current density is less than about 1 mA/cm$^2$ but less decreases when the current density exceeds about 1 mA/cm$^2$, and reaches a lower limit value of about 1000 Ωcm$^2$. It is considered that when the discharge current density exceeds about 1 mA/cm$^2$, the reaction rate of "dissolving magnesium" can be made higher than the oxidation reaction rate of "reacting magnesium with oxygen".

(2. Discharge Capacity Density: X and Negative Electrode Impedance: Z)

The dependence of the negative electrode impedance on the discharge capacity density was confirmed. The discharge current density: Y was kept at a constant level of 2.27 mA/cm$^2$ and the discharge capacity density: X was changed from 0.6 mA/cm$^2$ to 3.62 mAh/cm$^2$ and the negative electrode impedance: Z was measured at a predetermined discharge capacity density: X in the range. FIG. 4 shows a test result for sample No. 2. P2-1 to P2-5 in FIG. 4 show plots corresponding to the sample No. 2. Concrete numerical values for each of plot P2-1 to P2-5 are shown in Table 1.

It can be seen from FIG. 4 that the negative electrode impedance decreases monotonously along with increase in the discharge capacity density within a range where the discharge capacity density is less than about 2 mAh/cm$^2$ but less decreases when the capacity density exceeds about 2 mA/cm$^2$ and reaches a lower limit value at about 200 Ωcm$^2$. It is considered that, when the discharge capacity density exceeds about 2 mAh/cm$^2$, the area of the bare surface increases more by continuing the discharging and the amount of elemental magnesium material to be eluted could be ensured.

(3. Discharge Capacity Density X and Discharge Current Density: Y)

In the same manner as obtaining a relation of (1. discharge current density: Y and negative electrode impedance: Z) and a relation of (2. discharge capacity density: X and negative electrode impedance: Z), a test for measuring the negative electrode impedance: Z under the condition at other predetermined other value X or at other predetermined value Y was performed. Based on the result of the test, a schematic graph of FIG. 5 was obtained for the inverse proportional relation between the discharge capacity density X and the current density: Y in relation with the measured value for the impedance: Z. FIG. 5 shows plots P1-1 to P1-4 and P2-1 to P2-5 according to the samples No. 1 and No. 2.

As shown in Table 1 and FIG. 5, it can be seen that a desired negative electrode impedance: Z (about 1000 $\Omega cm^2$ or less) can be substantially realized within an actual range of use of the capacity and the current within a range of: $X \times Y \geq 1.3$. That is, when a current density at a predetermined level or higher is obtained within a range of the predetermined discharge capacity density, it may be preferable to form the bare surface at the surface of the negative electrode, so that a standard capable of decreasing the negative electrode impedance more reliably can be obtained.

(4. Oxygen Supply and Saturation Upper Limit Value of Negative Electrode Impedance)

A test for confirming the effect of oxygen supply during discharging was performed. In sample No. 3, the negative electrode impedance was measured on every predetermined elapsed time for the sample applied with the initializing discharge process and left as it was after the completion of the discharging. In sample No. 4, the negative electrode impedance was measured every predetermined elapsed time for the sample applied with the initializing discharge process while supplying oxygen and left as it was after the completion of the discharging. In the sample No. 4, oxygen was supplied by the procedures described above. Pure oxygen was filled at 0.01 MPa to a reservoir made of stainless steel of 200 cc volume. Then, reservoir and the first upper casing 51 were connected by way of a flexible tube and a joint connected to the reservoir for introducing oxygen. Then, pure oxygen was supplied by opening a valve intervened in the flexible tube at a predetermined timing.

FIG. 6 shows a graph in which the measured negative electrode impedance values are plotted respectively on the axis of the elapsed time. Plots P3 and P4 in FIG. 6 correspond to the sample No. 3 and the sample No. 4 respectively. Table 1 shows specific numerical values for each of the plots P3 and P4.

Further, a plot S in FIG. 6 is a plot corresponding to comparative example. A result of an identical test when the magnesium battery Ba was left as it was after the assembling without performing the initializing discharge process as a comparative example.

It was formed from FIG. 6 that in the samples No. 3 and No. 4 applied with the initializing discharge process, the negative electrode impedance shown by the rise of each of the curves (just after assembling at the elapsed time of about 0) can be decreased to less than that of the comparative example.

Further, it was formed that in the sample No. 4 applied with the initializing discharge process under oxygen supply, the saturation upper limit value of the negative electrode impedance can be decreased (to about several 1000 $\Omega cm^2$) compared with the sample No. 3 without oxygen supply (saturation upper limit value of the negative electrode impedance of several 10,000 $\Omega cm^2$). The numerical values of the negative electrode impedance: Z according to the sample No. 3, the sample No. 4, and the comparative example in Table 1 represent the saturation upper limit values of the negative electrode impedance.

(5. Result of SEM Observation)

FIG. 1 is a SEM photograph for the surface of the negative electrode corresponding to plot P2-1 according to the sample No. 2 in FIG. 4, and FIG. 2 is also an SEM photograph for the surface of the negative electrode corresponding to the plot P2-5.

In FIG. 1, a concave bare surface B1 due to elution of magnesium ions at the negative electrode surface by the discharging was observed, but a planar surface A1 by polishing upon assembling by a glass edge is left. The planar surface A1 is a negative electrode surface covered by the oxide layer of magnesium oxide.

On the other hand, in FIG. 2, bare surface (convex bare surface A2, concave bare surface B2) is formed over the entire surface of the negative electrode by sufficient discharging and the oxide layer of a magnesium oxide formed at the surface before the discharging just after assembling (planar surface A1) is substantially eliminated.

That is, magnesium layer of magnesium oxide formed on the surface of the negative electrode before discharge is eluted starting from weak spots (pinholes or thin portions of oxide layer) by discharge. A phenomenon in which magnesium at the weak spots start to elute and, further, the oxide film formed on the eluted magnesium is defoliated simultaneously develops. It is considered that the negative electrode impedance is decreased since the region where the oxide film is present is gradually decreased and, instead, the bare surface of elemental magnesium is exposed.

<ii. Initializing Discharge Process and Charge Process>

(1. Oxygen Supply and Saturation Upper Limit Value of Negative Electrode Impedance)

A test was performed for confirming the effect of the charge process and the effect of oxygen supply during charging. Test results for samples Nos. 21 to 25 are shown in FIG. 7 and Table 2.

In samples Nos. 21 to 23, the initializing discharge process is at first performed and the charge process is performed soon after. Then, each of the samples after completion of the charge process was left as it was. The negative electrode impedance of each of the samples was measured on every elapsed time while leaving the sample.

For the sample No. 24, the initializing charge process was performed at first while supplying oxygen and, soon after, the charge process was performed while supplying oxygen. Then, after the completion of the charge process, the sample was left as it was. The negative electrode impedance of the sample was measured on every predetermined elapsed time while leaving the sample. Pure oxygen was supplied during discharging and charging by the same method as for the sample No. 4 described above.

The treatment for the sample No. 25 is different from the sample No. 24 in that pure oxygen is supplied only during the charging. The negative electrode impedance was measured on every predetermined elapsed time in the same manner as in other samples (Nos. 21 to 24).

FIG. 7 shows a graph in which the negative electrode impedance measured respectively are plotted to the axis of the elapsed time. Plots P21 to P25 in FIG. 7 correspond to the samples Nos. 21 to 25 respectively. Further, the plot S in FIG. 7 corresponds to the comparative example in which the magnesium battery Ba was left as it was without discharging after assembling. Specific numerical values for the respective plots P21 to P25 and S are shown in the Table 2 described above.

It can be seen from FIG. 7 that the negative electrode impedance just after assembling the magnesium battery Ba can be decreased by performing the charge process. It is considered that this is due to increase in the reaction sites at the surface of the negative electrode by the formation of the porous magnesium layer to be described later.

Further, it can also be seen that the saturation upper limit value of the negative electrode impedance can be decreased by the charge process. The saturation upper limit value of the negative electrode impedance of the samples Nos. 21 to 25 according to the example (about 400 to 1300 $\Omega cm^2$) is remarkably decreased by one digit or more compared with the comparative example. This may be attributable to that a magnesium layer that inhibits formation of a high impedance compound can be formed to suppress increase of the negative electrode impedance further. The numerical value of the negative electrode impedance: Z for each of the plots P21 to P25, and S of the samples Nos. 21 to 25 and the comparative example in the Table 2 represents the saturation upper limit value of the negative electrode impedance.

Further, it was found that the saturation upper limit value of the negative electrode impedance can be decreased more by performing the charge process while supplying oxygen than in a case of performing the charge process without supplying oxygen. It was also found that the saturation upper limit value of the negative electrode impedance can be decreased by supplying oxygen during the charging irrespective that oxygen is supplied or not in the initializing discharge process. Specifically, the saturation upper limit value of the negative electrode impedance of the samples (Nos. 24, 25) (about 400 to 600 $\Omega cm^2$) supplied with oxygen at least during the charging is decreased by about 900 to 400 $\Omega cm^2$ than the saturation upper limit value of the negative electrode impedance of the samples (Nos. 21 to 23) not supplied with oxygen during charging (about 1000 to 1300 $\Omega cm^2$). It is considered that the oxygen supplied during the charging further inhibits the formation of the high impedance compound to suppress the increase of the negative electrode impedance further.

(2. Discharge/Charge Capacity Density: X/U and Negative Electrode Impedance: Z)

Figure 8:
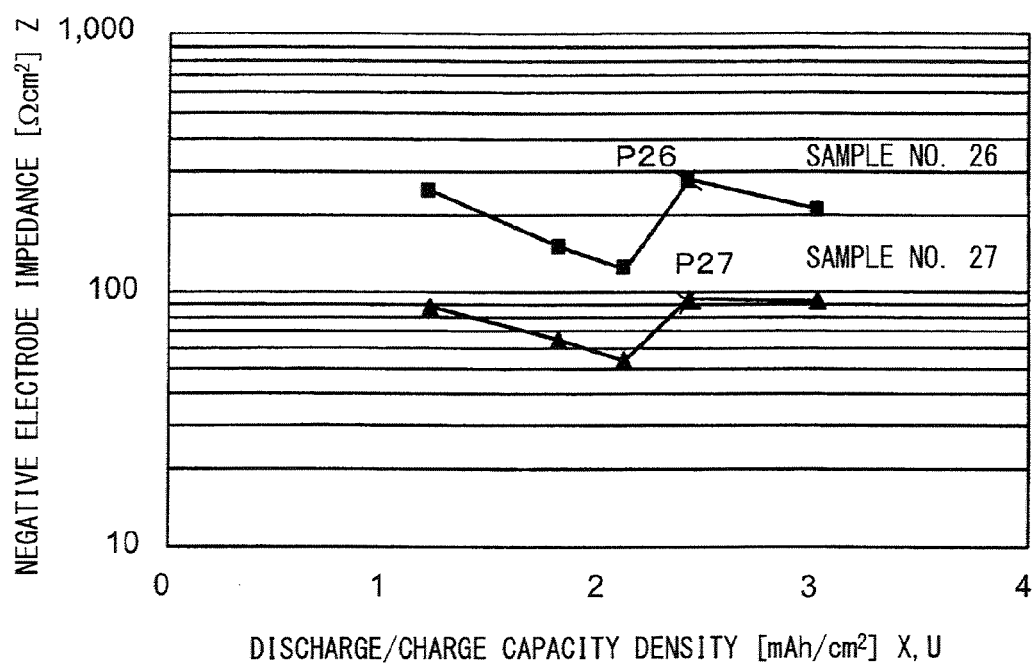
FIG. 8 is a graph illustrating a relation between a charge/discharge capacity density, and decrease of a negative electrode impedance.

Dependence of the negative electrode impedance on the charge capacity density was confirmed. The discharge current density: Y was kept at a constant level of 2.27 mA/cm$^2$ and the discharge capacity density: X was changed from 1.21 mAh/cm$^2$ to 3.02 mAh/cm$^2$. The negative electrode impedance: Z at the predetermined discharge capacity density: X within the range was measured. A test result for the sample No. 26 is shown in FIG. 8. P26 in FIG. 8 is a plot corresponding to the sample No. 26.

Successively, the charge current density: W was kept at a constant level of 2.27 mA/cm$^2$ and the charge capacity density: U was changed from 1.21 mAh/cm$^2$ to 3.02 mAh/cm$^2$. The negative electrode impedance: Z at the predetermined charge capacity density: U within the range was measured. A test result for the sample No. 27 is shown in FIG. 8. P27 in FIG. 8 is a plot corresponding to the sample No. 27. Further, specific numerical values of the plots P26 and P27 are shown in the Table 2.

It was found from FIG. 8 that the effect of decreasing the negative electrode impedance by about 100 $\Omega cm^2$ or more by performing the charge process can be expected further compared with the case of performing only the initializing discharge process. That is, it was found that the amount of decreasing the impedance can be obtained about at a constant amount not depending on the discharge/charge capacity density. Accordingly, in the charge process, charging can be performed at a charge capacity density less than the discharge capacity density in the initializing discharge process. For example, the measured value of the negative electrode impedance of the sample No. 27 (P27) applied with the charge process (95 $\Omega cm^2$) is decreased by about 180 $\Omega cm^2$ than the measured value of the negative electrode, impedance of the sample No. 26 (P26) only applied with the initializing discharge process (275 $\Omega cm^2$). It is considered that this may be attributable to the increase of the reaction sites at the surface of the negative electrode by the formation of the porous magnesium layer to be described later.

Further, the measured value of the negative electrode impedance was obtained about at a certain value or less not depending on the discharge/charge capacity density by performing the charge process. Specifically, it was found that the negative electrode impedance can be suppressed to about 100 $\Omega cm^2$ or less.

(3. Charge Current Density: W' and Negative Electrode Impedance: Z')

Dependence of the negative electrode impedance on the charge current density was confirmed. For this purpose, the initializing discharge process was performed by using the magnesium battery Bb as a magnesium secondary battery.

By the way, elemental magnesium was eluted at the negative electrode by performing the initializing discharge of the magnesium secondary battery according to this embodiment. That is, an oxidation reaction proceeds in which the elemental magnesium is ionized by releasing electrons. On the other hand, magnesium or a magnesium compound is precipitated on the positive electrode. That is, a reduction reaction proceeded in which magnesium ions or the magnesium compound accept electrons. Successively, by performing the charging, an oxidation reaction proceeds in which magnesium or the magnesium compound precipitated during discharging is eluted at the positive electrode. Further, a reduction reaction in which magnesium or the magnesium compound precipitated during the discharging is eluted proceeds at the positive electrode. In the magnesium secondary battery according to the embodiment of the present disclosure, the reaction at each of the electrodes that magnesium or the magnesium compound is eluted or precipitated is repeated in accordance with the succeeding discharging or charging. The magnesium compound in the magnesium layer precipitated on the electrode by the charge process according to the embodiment of the present disclosure is a magnesium oxide which mainly comprises magnesium monoxide and magnesium peroxide.

The test of using the magnesium battery Bb was performed assuming that the reduction reaction proceeded at the positive electrode upon initializing discharge process also proceeded at the negative electrode upon charging. That is, it was assumed that, when the discharging was performed once, reaction upon charging proceeds at the negative electrode and, simultaneously, reaction proceeds at the negative electrode upon charging at the positive electrode. Then, the initializing discharge process was performed and the discharge capacity density: X was regarded as the charge capacity density: U' upon application of the charge process to the negative electrode (assuming that the positive electrode was replaced with the negative electrode). In the same manner, the discharge current density: Y was regarded as the charge current density: W' upon application of the charge process. Further, the impedance of the positive electrode after the application of the initializing discharge process was regarded as the negative electrode impedance: Z' after application of the charge process. In the following description, U', W' and Z' each attached with symbol "'" represent the regarded values. Further, the term "charge" related to the charge current density: W', etc. is a state when the initializing discharging process is performed and the behavior of the positive electrode upon discharging corresponds to the state when the initializing discharge process is performed and the behavior of the positive electrode upon discharge process is replaced for that of the negative electrode upon charging.

Specifically, the discharging was performed while setting the discharge capacity density to a constant level of 1.8 mAh/cm$^2$ and changing the current density to 0.28 mA/cm$^2$, 0.57 mA/cm$^2$, and 2.26 mA/cm$^2$, respectively. For the samples left as they were after the completion of discharging, the negative electrode or positive electrode impedance was measured on every predetermined elapsed time. FIG. 9 shows a graph formed by plotting the measured values of the negative electrode or positive electrode impedance to the axis of the elapsed time. Each of plots P30, 32, 34, and 36 corresponds to each of samples Nos. 30, 32, 34, and 36 respectively. Specific numerical values of the respective plots are shown in Table 2 above. The numerical values for the negative electrode impedance: Z. Z' according to each of the plots P30, 32, 34, and 36 in the Table 2 represent the saturation upper limit values of the negative electrode impedance.

It was found from FIG. 9 that when the charge process was performed at a charge current density: W' of 028 mA/cm$^2$, the saturation upper limit value of the negative electrode impedance: Z' could be decreased further from 50000 Ωcm$^2$ to 5000 Ωcm$^2$ compared with a case of performing only the initializing discharge process. Further, when the charge process was performed at the charge current density: W' of 0.57 mA/cm$^2$, the saturation upper limit value of the negative electrode impedance: Z' could be decreased further to about 1000 Ωcm$^2$. Then, it was found that even when the charge current density: W' increased as far as 2.26 mA/cm$^2$, the saturation upper limit value of the negative electrode impedance: Z' remained at about 1000 Ωcm$^2$.

In view of the above, it was found that by performing the charge process at a higher charge current density: W', the decreasing amount of the saturation upper limit value of the negative electrode impedance was increased further till it reached a predetermined charge current density. Further, it was found that the effect of decreasing the saturation upper limit value of the negative electrode impedance was saturated when the charge current density: W' exceeded a predetermined level. In view of the above, a standard that charging is performed preferably at a charge current density of 0.25 mA/cm$^2$ or more or 0.28 mA/cm$^2$ or more was obtained since the saturation upper limit value of the negative electrode impedance can be increased reliably. Further, a standard is obtained that the charge process is performed preferably at the charge current density of 0.5 mA/cm$^2$ or more or 0.57 mA/cm$^2$ or more since the effect of decreasing the saturation upper limit value of the negative electrode impedance could be ensured most effectively.

(4. Result of SEM Observation)

FIG. 10 is a SEM photograph for the cross section of the negative electrode in which the entire surface illustrated in FIG. 2 forms a bare surface and FIG. 11 is a SEM photograph for the cross section of the magnesium layer precipitated on the bare surface illustrated in FIG. 10 by performing the charge process at the capacity density and the current density identical with those in discharging. Specific values of discharge/charge conditions, etc. for samples Nos. 28 and 29 of the negative electrode of the magnesium battery Ba in FIG. 10 and FIG. 11 are as shown in Table 2. The charge process for the sample No. 29 was performed just after the initializing discharge process.

As illustrated by the SEM photograph of the bare surface of FIG. 10, the depth of the concave bare surface B2 formed by elution of magnesium at the initializing discharge process was 8 μm. Further, as illustrated in the SEM photograph of FIG. 11, the thickness T of the magnesium layer M formed by the charge process was 40 μm. That is, it can be seen that a magnesium layer M of a thickness T which is five times as large as the depth of the concave bare surface B2 was formed on the surface of the negative electrode after the charge process.

Further, a portion of the magnesium layer M at the surface of the negative electrode is in a porous form having a number of fine voids as shown in the photograph. Accordingly, the surface area of the negative electrode having the magnesium layer M formed by the charge process is increased in accordance with the volume of the voids. That is, the surface area of the negative electrode applied with the charge process is outstandingly increased not only to the negative electrode surface just after assembling but also to the bare surface after the discharging. Accordingly, it is considered that since the reaction sites (reaction points) increase due to the increase of the effective surface area of the negative electrode and the amount of the reaction material at the surface of the electrode increases, the negative electrode impedance is decreased outstandingly and the negative electrode overvoltage can be suppressed to a practicable level.

In the SEM photograph of the magnesium layer M in FIG. 11, a portion of a fibrous separator having a circular transversal cross sectional shape also appears. An example thereof is shown by a black fat line in the photograph.

<iii. Magnesium Layer>

(1. Fine Void and Surface Area)

At first, the pore size distribution of fine voids of a product precipitated on the positive electrode was measured for the sample No. 36 of the magnesium battery Bb described above (refer to Table 2 and FIG. 9). The precipitates on the positive electrode were regarded as the magnesium layer formed on the surface of the negative electrode by the charge process. FIG. 12 illustrates the result of measurement for the pore size distribution of the magnesium layer.

As illustrated in the graph, it was found that the pore size of most of the fine voids in the magnesium layer of the sample No. 36 was distributed in a range from 10 Å to 20 Å. In the following description for "magnesium layer" in the example, precipitates formed on the positive electrode by the initializing discharge process were regarded as the magnesium layer formed on the surface of the negative electrode by the charge process. The reason is mainly attributable to the elimination of the effect of the magnesium negative electrode upon analysis of the magnesium layer to be described later.

Then, for the magnesium battery Bb, dependence of the effective surface area of the magnesium layer on the charge current density: W was confirmed. FIG. 13 illustrates a result of measuring the effective surface area of the magnesium layer on the samples Nos. 31 to 34, 36, and 37. Further, Table 3 shows specific values, etc. of the charge current density: W'.

As illustrated in FIG. 13 and Table 3, in the samples Nos. 31 to 33 applied with the charge process at the charge current density: W' of 0.42 mA/cm$^2$ or less, the effective surface area of the magnesium layer was at a lower limit value of 0.001 m$^2$ or less of a specific surface area measuring instrument and could not be measured. On the other hand, in the sample No. 34 applied with the charge process at a charge current density: W' of 0.57 mA/cm$^2$, the effective surface area was measured as 0.18 m². Further, in the samples applied with the charge process at the charge current density: W' of larger than 0.57 mA/cm², an effective surface area about identical with that of the sample No. 34 was measured. That is, the effective surface area of the magnesium layer was saturated at about 0.18 m² as the upper limit.

By the way, the magnesium layer is precipitated in a circular region of $8 \times 10^{-3}$ diameter. Table 3 shows an approximate value of the surface area increment determined by dividing the effective surface area of the magnesium layer in FIG. 13 by a projection area ($5.02 \times 10$ m²) thereof. It was found that the effective surface area at about 0.18 m² of the magnesium layer increased outstandingly to the projection area and corresponded to about 3500 to 3600 times thereof.

As has been described previously, the surface area of the negative electrode increases when the magnesium layer becomes a porous shape. For example, sample No. 34 and sample No. 36 show satisfactory saturation upper limit values of the negative electrode impedance at about identical levels and it can be supposed that they have identical porous magnesium layers. In view of the result of the test, examples of the porous form capable of developing preferred saturation upper limit value of the negative electrode impedance includes the following forms.

At first, the magnesium layer may preferably have voids of a pore size distributed in a range from 10 Å to 20 Å shown in FIG. 12. The magnesium layer having voids of pore size corresponding to the pore size distribution in FIG. 12 can contribute to suitable increase of the effective surface area of the layer.

Further, it may be more preferred that the surface area increment determined by dividing the effective surface area of the magnesium layer by a projection area of the layer exhibits about 3500 times. When the magnesium layer is formed, since this can outstandingly increase the area at the surface of the negative electrode at a portion of precipitation, this can contribute to suitable decrease of the saturation upper limit value of the negative electrode impedance further.

Further, with the view point of ensuring a larger area at the surface of the negative electrode, it may be preferable to perform the charge process at a charge current density: W' of 0.5 mA/cm² or higher. This can contribute to the decrease of the negative electrode impedance most effectively.

As illustrated in FIG. 13, the effective surface area of the magnesium layer increases critically within a range of the charge current density: W' of 0.42 to 0.57 mA/cm². The charge current density: W'=0.5 mA/cm² is about an intermediate value in the range. That is, for the effect capable of outstandingly increasing the surface area of the negative electrode, there may be a possibility of causing remarkable difference between about 0.5 mA/cm² or more and about less than 0.5 mA/cm².

In the measurement of the pore size distribution of fine voids, it has been known that the magnesium layer formed by the charging at a low charge current density: W' less forms voids of a measurable pore size. That is, pore diameters of a measurable size are less formed. For example, when the charge current density: W' is 0.42 or lower, voids of a pore size contributing to the increase of the effective surface area are less formed and no significant effect of ensuring larger area of the negative electrode surface can be obtained.

On the other hand, when the charge current density: W' is 0.57 mA/cm² or higher, the surface area increment exceeds 3,500 times, and the outstandingly large surface area of the negative electrode can be ensured. Further, the effect of increasing the surface area remains at an identical level even when the charging is performed at a charge current density: W' of 0.57 mA/cm² or higher. Generally, as the charge current density: W' is higher, the stability of the non-aqueous electrolyte to oxidation/reduction of the electrode may possibly be deteriorated. The risk that the electrolyte itself causes oxidation/reduction reaction increases. Accordingly, it may be most preferable to apply the charge process so as to provide a surface area as large as possible at a charge current density: W' of 0.5 mA/cm² or more but as low as possible.

(2. Composition of Magnesium Layer)

At first, FIG. 14A to FIG. 14F and FIG. 15A to FIG. 15F show XPS spectra of the products precipitated on the positive electrode of the magnesium battery Bb, that is, a magnesium layer. The XPS spectra were measured for the samples Nos. 31, 32, and 34 to 37. They were applied with the charge process at a predetermined charge current density: W' within a range of 0.057 to 3.398 mA/cm² illustrated in Table 3.

FIG. 14A to FIG. 14F show spectra of magnesium (Mg (2p)) in the magnesium layer. In each of FIG. 14A to FIG. 14F, a solid line represents a measured spectrum of a magnesium layer sample, a dotted chain and a dotted line show spectra of a magnesium oxide ($MgO_x$) and elemental magnesium obtained by fitting the measured spectrum to a curve. The magnesium oxide has a peak of a bonding energy at 51.0 eV. The elemental magnesium has a peak of the bonding energy at 49.8 eV. It was found that the magnesium layer comprised an elemental magnesium ingredient and a magnesium oxide ingredient.

FIG. 15A to FIG. 15F show spectra of oxygen (O(1s)) in the magnesium layer. In each of FIG. 15A to FIG. 15F, a solid line shows the measured spectrum of the magnesium layer samples, and a dotted chain and a dotted line show spectra of a magnesium oxide (MgO) and a magnesium peroxide ($MgO_2$) obtained by fitting measured spectra to a curve. The magnesium oxide has a peak of the bonding energy at 531.2 eV. The magnesium peroxide has a peak of bonding energy at 532.7 eV. It was found that the magnesium oxide in the magnesium layer comprises the magnesium oxide ingredient and the magnesium peroxide ingredient.

Further, the compositional ratio of elemental magnesium and elemental oxygen in the magnesium layer sample was calculated by quantitative analysis based on the magnesium spectra in FIG. 14A to FIG. 14F and oxygen spectra in FIG. 15A to FIG. 15F. A relation of the charge current density: W' to the compositional ratio between the elemental magnesium and elemental oxygen is shown in FIG. 16 and column (A) in Table 3. Further, the ingredient ratio of elemental magnesium and magnesium oxide in the magnesium layer was determined based on the magnesium spectra of the magnesium layer of FIG. 14A to FIG. 14F and shown in the column (B) in the Table 3. The ingredient ratio of magnesium monoxide and magnesium peroxide in the magnesium oxide contained in the magnesium layer was determined based on the oxygen spectra in the magnesium layers of FIG. 15A to FIG. 15F and they are shown in the column (C) in Table 3.

In view of FIG. 16 and Table 3, it was found that the compositional ratio of the elemental magnesium and the elemental oxygen in the magnesium layer is about 56:44 and the elemental magnesium is contained more for the sample No. 31 at a charge current density: W of 0.057 mA/cm². Further, it was found that as the charge current density: W' increased in a range of the charge current density: W' of 0.057 to 0.57 mA/cm², the elemental magnesium tended to decrease and the elemental oxygen tended to increase. Specifically, for the sample No. 34 at the charge current density: W' of 0.57 mA/cm², it was found that the compositional ratio between elemental magnesium and elemental oxygen in the magnesium layer was reversed to about 48:52 in which elemental oxygen was contained more. Further, it was found that the compositional ratio between the elemental magnesium and the elemental oxygen did not change greatly even when the charge current density: W' increases to 0.57 mA/cm² or higher.

In view of the result of the test, the magnesium layer capable of providing a preferred saturation upper limit value of the negative electrode impedance can be provided in the following forms.

The compositional ratio between elemental magnesium and the elemental oxygen in the magnesium layer: Mg:O (at %) may be within a range of a ratio of about 56:44 to 48:52, or 52:48 to 48:52 and, preferably, 50:50 to 48:52.

A lower ingredient ratio of elemental magnesium in the magnesium layer means that the ingredient ratio of the magnesium oxide in the magnesium layer is higher. The magnesium layer precipitated to the electrode as a result of the charge process according to the embodiment of the present disclosure can be precipitated in a porous form at a low density. This is considered to be attributable to that the magnesium monoxide and magnesium peroxide as the magnesium oxide are formed in the magnesium layer. Accordingly, the ingredient ratio of the magnesium oxide in the magnesium layer according to the embodiment of the present disclosure may be preferably higher, since the voids having a pore size that outstandingly increases the effective surface area of the electrode is formed suitably due to the formation of the magnesium oxide. That is, it is considered that the effective surface area of the negative electrode increases to increase the reaction sites (reaction points) and, as a result, the reaction amount is increased to enable a large current to be supplied, and the negative electrode impedance is lowered.

On the contrary, higher ingredient ratio of the elemental magnesium in the magnesium layer means that the magnesium layer can be precipitated at a higher density. This may be disadvantageous with a view point of increasing the reaction sites of the electrode but may be preferred with a view point of decreasing the electric resistivity of the electrode material. That is, since the electric resistivity of the magnesium oxide per se is high, a lower ingredient ratio can contribute to the decrease of the negative electrode impedance. When the ratio between elemental magnesium and elemental oxygen in the magnesium layer is within a range of the ratio at about 50:50 to 48:52, advantages of increasing the reaction sites and decreasing the electric resistivity that conflict each other are compatible while keeping the balance between both of them. That is, decrease of the negative electrode impedance or the saturation upper limit value of the negative electrode impedance can be achieved collectively.

Further, it is considered that the charge process may be performed at the following charge current density: W' in order to precipitate the magnesium layer provided with a suitable composition of the elemental magnesium and the elemental oxygen to attain the suitable decrease of the negative electrode impedance or decrease of the saturation upper limit value of the negative electrode impedance.

The charging may be performed at a charge current density of 025 mA/cm² or higher, or 028 Ma/cm² or higher in order to precipitate a magnesium layer in which the ratio: Mg:O (at %) is from 52:48 to 48:52. In the same manner, the charging may be performed at a charge current density of 0.5 mA/cm² or higher or 0.57 mA/cm² or higher in order to precipitate a preferred magnesium layer at a ratio of 50:50 to 48:52.

Further, the compositional ratio between the elemental magnesium and the elemental oxygen in the magnesium layer does not substantially change at a charge current density of 0.57 mA/cm² or higher. With the view point that the charge current density is preferably lower for the identical saturation upper limit value of the negative electrode impedance, it may be preferable to perform the charge process at a charge current density of about 0.5 mA/cm² to about 0.57 mA/cm² or more.

(3. X-Ray Diffraction of Magnesium Layer)

The products precipitated on the positive electrode for the sample No. 36 of the magnesium battery Bb described above, that is, the magnesium layer was analyzed by XRD. The magnesium layer was defoliated from the gold foil and the magnesium layer itself was measured. The result of measurement is shown in FIG. 17. As illustrated in the graph, all of appearing peaks can be indexed by the elemental magnesium. That is, it was found that a crystalline ingredient in the magnesium layer only consisted of the elemental magnesium and magnesium oxide containing the magnesium oxide and the magnesium peroxide were amorphous.

The magnesium layer according to the embodiment of the present disclosure repeats elution and precipitation at each of the electrodes in accordance with the discharging or the charging. Since the magnesium oxide is precipitated in the amorphous state which is easy to be decomposed, the magnesium layer can be eluted more easily. That is, since the elution resistance of the magnesium layer can be suppressed, this can contribute to the decrease of the negative electrode impedance.

In the present specification, while the description has been made to the decrease of the negative electrode impedance, the magnesium layer as a characteristic constitution in the magnesium secondary battery according to the embodiment of the present disclosure repeats elution or precipitation on both of the positive and negative electrodes in accordance with the discharging or the charging. Accordingly, it is considered that the mechanism of decreasing the negative electrode impedance due to the formation of the magnesium layer described above provides the same effect also for the positive electrode. That is, the embodiment of the present disclosure can provide a magnesium secondary battery capable of decreasing the electrode impedance and suppressing the overvoltage of the magnesium secondary battery.

It can be seen from the examples described above that the negative electrode impedance can be decreased by performing the surface treatment method of the embodiment of the present disclosure.

It can be seen from the examples described above that the saturation upper limit value of the negative electrode impedance can be decreased by performing the surface treatment method of the embodiment of the present disclosure.

Further, it can be seen that the surface treatment method of the embodiment of the present disclosure can provide the effect also for the negative electrode for a magnesium secondary battery having an oxide layer at the surface.

According to the present disclosure, various embodiments of a surface treating method of a negative electrode for a magnesium secondary battery, a negative electrode for a magnesium secondary battery, and a magnesium secondary battery can be provided. For making the present disclosure, the inventors of the present applications have studied a magnesium secondary battery and have found that the negative electrode impedance can be decreased by forming a bare surface at the negative electrode by discharging to initialize the surface of the negative electrode.

Further, the inventors of the present application have found that a saturation upper limit value of the negative electrode impedance can be decreased by performing discharging for forming a magnesium layer over the bare surface formed at the negative electrode by the discharging.

According to a first example of embodiments, a surface treating method of a negative electrode for a magnesium secondary battery is provided, wherein the magnesium secondary battery includes: a negative electrode for releasing magnesium ions during discharging and for precipitating elemental magnesium during charging; a positive electrode for precipitating a magnesium oxide during the discharging and for releasing magnesium ions during the charging; and a non-aqueous ion conductor for conducting magnesium ions as conduction species. The surface treating method comprising performing an initializing discharge process to initialize the negative electrode. The initializing discharge process includes, by performing discharging, forming a bare surface at a surface of the negative electrode.

According to the above surface treating method, a bare surface can be formed on the surface of the negative electrode by performing the discharging. A surface not containing a high impedance compound is exposed at the surface by the formation of the bare surface, and the negative electrode impedance can be decreased.

Further, the negative electrode material is eluted from the surface of the negative electrode by performing discharging. When elution proceeds, the high impedance compound formed at the surface of the negative electrode before the discharging is defoliated. When the discharging is performed continuously, since the area of the bare surface is increased, the negative electrode impedance can be decreased more.

It may be preferable that the negative electrode comprises a magnesium-based metal. When the negative electrode comprises the magnesium-based metal, electrochemical reaction can be taken place rapidly on the negative electrode of the magnesium secondary battery.

Further, in the initializing discharge process, it may be preferable to perform the discharging under a condition that satisfies the relation of the following expression (E):

$$X \times Y \geq 1.3 \quad \text{(E)}$$

where X is a discharge capacity density expressed as X mAh/cm² and Y is a discharge current density expressed as Y mA/cm².

As has been described above, the negative electrode material (for example, magnesium-based metal) is eluted from the surface of the negative electrode. On the other hand, in the magnesium secondary battery, a magnesium oxide can be precipitated by the reaction during discharging at the positive electrode. Accordingly, there may be a possibility that the magnesium-based metal as the negative electrode may possibly react with oxygen remaining or dissolved in a battery system. That is, there is a possibility that the initializing discharge process of "eluting magnesium" into an ion conductor and the oxidation reaction of "reacting magnesium with oxygen" may proceed at the surface of the negative electrode. If the rate of oxidation reaction of "reacting magnesium with oxygen" is higher, there may be a possibility that the negative electrode impedance increases. Then, preferably, the initializing discharge process at the negative electrode may be proceeded such that the reaction rate of the initializing discharge process of "eluting magnesium" is higher than the rate of oxidation reaction of "reacting magnesium with oxygen". Specifically, the initializing discharge process is performed while ensuring the discharge current at the initializing discharge process.

Further, the discharge capacity during the discharging is in proportion to the amount of the negative electrode material to be eluted for forming the bare surface. Then, a current density at a certain level or higher can be obtained within a range of a predetermined discharge capacity density by the discharging condition according to the expression (E) above. The reaction rate of "eluting magnesium" can be made higher in the initializing discharge process. As a result, preferably, the bare surface can be formed on the surface at the negative electrode, thereby decreasing the negative electrode impedance more reliably.

Further, in the initializing discharge process, it may be preferable to perform the discharging till the entire surface of the negative electrode becomes the bare surface. Since the entire surface of the negative electrode becomes a bare surface and does not have a high impedance compound, the negative electrode impedance can be decreased more reliably.

Further, in the positive electrode, it may be preferable that the positive electrode active material comprises oxygen, and that the initializing discharge process is performed in a state where the magnesium secondary battery has been assembled and oxygen is further supplied in the battery system.

As described above, the negative electrode impedance can be decreased by performing the initializing discharge process. However, if the battery is left once after the surface treatment, impedance of the negative electrode may be possibly increased till the impedance is saturated at a predetermined upper limit value (value of the impedance in such a case is generally referred to as "saturation upper limit value" of the negative electrode impedance). Since magnesium is a material that is liable to be oxidized extremely in its nature, it is considered that the high impedance compound may be formed again on the bare surface exposed at the negative electrode. Then, the saturated upper limit value of the negative electrode impedance can be decreased by performing the initializing discharge process while supplying oxygen to the battery system compared with the case of not supplying oxygen. Accordingly, the overvoltage of the negative electrode can be suppressed continuously even after performing the surface treatment to maintain the level of a practicable overvoltage as the magnesium secondary battery.

According to a second example of embodiments, a surface treating method of a negative electrode for a magnesium secondary battery is provided, wherein the magnesium secondary battery includes: a negative electrode for releasing magnesium ions during discharging and for precipitating elemental magnesium during charging; a positive electrode for precipitating a magnesium oxide during the discharging and for releasing magnesium ions during the charging; a non-aqueous ion conductor for conducting magnesium ions as conduction species. The surface treating method comprises: performing an initializing discharge process to initialize, the negative electrode, wherein the initializing discharge process includes, by performing discharging, forming a bare surface at a surface of the negative electrode; and performing a charge process after the initializing discharge process, wherein the charge process includes, by performing charging, forming a magnesium film at the surface of the negative electrode.

First, the initializing discharge process of forming the bare surface thereby removing the high impedance compound is performed. The initializing discharge process is identical with the method of treating the surface of the negative electrode for the magnesium secondary battery according to the above-described first example. Therefore, a bare surface is formed on the surface of the negative electrode.

In the surface treating method, the charge process is performed after the initializing discharge process. In the charge process, a magnesium layer formed by the charging is precipitated so as to cover the bare surface after removing the high impedance compound. The magnesium layer formed by precipitation hinders the formation of the high impedance compound again at the surface of the negative electrode. Accordingly, increase of the impedance of the negative electrode can be suppressed by forming the magnesium layer to decrease the saturated upper limit value of the negative electrode impedance. Accordingly, since the overvoltage of the negative electrode can be suppressed continuously even after performing the surface treatment, the overvoltage can be maintained favorably to a practicable level as the magnesium secondary battery.

In the present specification, "magnesium layer" formed at the surface of the negative electrode by the charge process is not limited to the layer only consisting of elemental magnesium precipitated on the negative electrode during the charging. That is, this is not limited to an ideal layer in which magnesium ions that migrate in the ion conductor are precipitated as they are as elemental magnesium at the negative electrode. All of the layers that are formed due to the electrochemical reaction during the charging and precipitated covering the bare surface of the negative electrode are included in the magnesium layer. More specifically, the layer includes a magnesium layer in which magnesium in the negative electrode material reacts at the boundary between the bare surface and the ion conductor and can be precipitated at the surface of the negative electrode. Further, the magnesium layer also includes a layer in which the magnesium ions and other ions are reacted in the ion conductor and can be precipitated at the bare surface of the negative electrode or a layer that corresponds to a so-called SEI layer formed at the surface of the electrode in the lithium ion battery.

Further, in the charge process, it may be preferable to perform the charging just after the initializing discharge process. The charge process performed just after the initializing discharge process means charging that is performed while keeping the state where the re-formation of the high impedance compound does not proceed effectively. If the battery is left without charging after the initializing discharge process, the high impedance compound may possibly be formed again at the negative electrode. By performing the charging just after the initializing discharge process, re-formation of the high impedance compound can be suppressed to suppress increase of the negative electrode impedance.

Further, in the positive electrode, it may be preferable that the positive electrode active substance comprises oxygen and that the charge process is performed in a state where the magnesium secondary battery has been assembled and oxygen is supplied further in the battery system.

The saturation upper limit value of the negative electrode impedance can be decreased more effectively as compared with the cases of performing the charge process without supplying oxygen. Accordingly, the overvoltage of the negative electrode can be suppressed continuously even after performing the surface treatment to maintain the level of the practicable overvoltage of the negative electrode as the magnesium secondary battery more preferably.

Further, it may be preferable to perform the charge process at a charge current density of 0.5 mA/cm$^2$ or higher.

When the charge process is performed, the saturation upper limit value of the negative electrode impedance is decreased. As the charge current density during the charging is higher, the amount of decreasing the saturation upper limit value (decreasing effect) is increased. The effect of decreasing the saturation upper limit value is saturated when the charge current density exceeds a predetermined value. The decreasing effect can be maximized by performing the charging at a charge current density of 0.5 mA/cm$^2$ or higher.

Further, it may be preferable that the magnesium layer has a density lower than that of the negative electrode. The magnesium layer of low density includes, for example, a magnesium layer having a number of fine crevices, gaps, voids, or pores, and includes, for example, a magnesium layer having a (low density) structure. The magnesium layer has voids with a pore diameter of 10 Å to 20 Å. It may be preferable that the average pore diameter of the voids of the magnesium layer is included in the range of the pore diameter described above and it may be more preferable that substantially all of the voids are included within the range of the pore diameter.

When the density of the magnesium layer formed at the surface of the bare surface is low, the surface area of the negative electrode having the layer can be larger than the surface area of the negative electrode having only the bare surface. Accordingly, larger effective surface area can be ensured as the entire negative electrode, and the negative electrode impedance can be decreased. Particularly, it may be preferable that the magnesium layer contains many fine voids or pores since the effective surface area of the negative electrode having the layer is increased reliably. Further, it may be particularly preferable that the magnesium layer is a porous layer having a number of voids with a pore diameter of 10 Å to 20 Å since the effective surface area at the entire negative electrode can be increased outstandingly. Further, the magnesium layer has a uniform low density but does not have a dendritic form that may cause short circuit.

Further, it may be preferable that the magnesium layer is formed on the surface of the negative electrode at a thickness larger than that which can be calculated based on the discharge capacity. A large effective surface area of the negative electrode having the magnesium layer can be ensured reliably by so much as the thickness is larger, and the negative electrode impedance can be decreased.

It may be preferable that the magnesium layer has a composition containing oxygen. The magnesium layer can contain elements other than magnesium. That is, the layer may also contain oxygen. Magnesium in the magnesium layer is readily reacted with oxygen to form a magnesium oxide. That is, the magnesium layer can contain the magnesium oxide. Preferred magnesium oxide may include magnesium monoxide and magnesium peroxide.

The magnesium oxide in the magnesium layer formed by the charge process is precipitated while forming a number of fine voids in the magnesium layer as will be described later. Therefore, the effective surface area of the negative electrode is increased to increase the reaction sites of the negative electrode. By the way, the magnesium oxide per se is less conductive and increases the impedance. However, since the magnesium layer has fine voids, this can provide an effect that further exceeds the increase of the impedance caused by the increase of the electric resistivity due to the magnesium oxide. That is, the porous magnesium film has an effective surface area not only offsetting the increase of the impedance due to the magnesium oxide but also providing an effect of further decreasing the impedance. In the present specification, the magnesium oxide in the magnesium layer different from the high impedance compound is sometimes collectively referred to simply as "in-layer magnesium oxide". By the formation of the in-layer magnesium oxide, the effective surface area of the electrode can be increased to increase the reaction sites (reaction points), and the amount of the reaction material at the electrode surface can be increased, which enables to supply a high current and can contribute to the decrease of the negative electrode impedance. Further, the in-layer magnesium oxide can also contribute to the hindrance of formation of the high impedance compound and decrease of the saturation upper limit value of the negative electrode impedance.

According to a third example of embodiments, a negative electrode for a magnesium secondary battery applied with the surface treating method of any one of the above-described first and second examples is provided. According to this third example, the negative electrode for the magnesium secondary battery having the advantageous effect of the above-described surface treating method of any one of the first and second examples can be provided. Further, it may be preferable that the negative electrode for the magnesium secondary battery is applied with the above-described surface treating method of the second example.

According to a fourth example of embodiments, a magnesium secondary battery comprising the negative electrode of the above third example is provided. According to this fourth example, a magnesium secondary battery having the advantageous effect of the negative electrode according to the third example can be provided.

According to the above surface treating method, the above negative electrode and the above magnesium secondary battery, the negative electrode impedance can be decreased in the surface treating method including the initializing discharge process, in which the bare surface is formed at the negative electrode to initialize the surface of the negative electrode.

Further, when the charge process including forming the magnesium layer to the bare surface formed at the negative electrode by the discharging is performed, the magnesium layer hinders re-formation of the high impedance compound at the surface of the negative electrode. Accordingly, formation of the magnesium layer can suppress an increase of the negative electrode impedance and a decrease the saturation upper limit value of the negative electrode impedance.

Further, by providing the negative electrode for the magnesium secondary battery applied with the surface treatment method and the magnesium secondary battery using such a negative electrode, it is possible to provide a magnesium secondary battery in which the overvoltage of the negative electrode is suppressed to a practicable level.

When the magnesium secondary battery is compared with a lithium ion secondary battery, since a magnesium ion has a larger number of valence, the magnesium secondary battery can have a higher energy density per unit volume. Further, the magnesium secondary battery has the following advantages: magnesium does not form dendrites during precipitation as in the case of lithium; the melting point is higher than that of lithium; poisoning nature is low; safety is excellent; and further, the cost is low.

Embodiments of the present disclosure are not limited to the above embodiments and modifications. That is, the above embodiments and modifications thereof may be modified or combined in various ways without departing from the sprit and scope of the present disclosure.

What is claimed is:

1. A surface treating method of a negative electrode for a magnesium secondary battery, wherein the magnesium secondary battery includes: a negative electrode for releasing magnesium ions during discharging and for precipitating elemental magnesium during charging; a positive electrode for precipitating a magnesium oxide during the discharging and for releasing magnesium ions during the charging; and a non-aqueous ion conductor for conducting magnesium ions as conduction species, the surface treating method comprising:
performing an initializing discharge process to initialize the negative electrode, wherein the initializing discharge process includes, by performing discharging, forming a bare surface at a surface of the negative electrode, and
in the initializing discharge process, the discharging is performed by supplying an electric current from an external power supply under a condition that satisfies the following relation:

$X \times Y \geq 1.3$ mA$^2$ h/cm$^4$, where
X is a discharge capacity density expressed as X mAh/cm$^2$, and
Y is a discharge current density expressed as Y mA/cm$^2$.

2. The surface treating method according to claim 1, wherein
the negative electrode comprises a magnesium-based metal.

3. The surface treating method according to claim 1, wherein
just after the initializing discharge process, the negative electrode has an impedance of 1000 Ωcm$^2$ or less.

4. The surface treating method according to claim 1, wherein
in the initializing discharge process, the discharging is performed until the entire surface of the negative electrode becomes the bare surface.

5. The surface treating method according to claim 1, wherein:
an active substance of the positive electrode is oxygen; and
in the initializing discharge process, the discharging is performed in a state where the magnesium secondary battery has been assembled and oxygen is supplied in a battery system.

6. A surface treating method of a negative electrode for a magnesium secondary battery, wherein the magnesium secondary battery includes: a negative electrode for releasing magnesium ions during discharging and for precipitating elemental magnesium during charging; a positive electrode for precipitating a magnesium oxide during the discharging and for releasing magnesium ions during the charging; a non-aqueous ion conductor for conducting magnesium ions as conduction species, the surface treating method comprising:
performing an initializing discharge process to initialize the negative electrode, wherein the initializing discharge process includes, by performing discharging, forming a bare surface at a surface of the negative electrode; and
performing a charge process after the initializing discharge process, wherein the charge process includes, by performing charging, forming a magnesium film at the surface of the negative electrode, and in the initializing discharge process, the discharging is performed by supplying an electric current from an external power supply under a condition that satisfies the following relation:

$$X \times Y \geq 1.3 \text{ mA}^2 \text{ h/cm}^4,$$

where

X is a discharge capacity density expressed as X mAh/cm$^2$, and

Y is a discharge current density expressed as Y mA/cm$^2$.

7. The surface treating method according to claim 6, wherein
after the initializing discharge process, the charge process is performed.

8. The surface treating method according to claim 6, wherein
the positive electrode active material of the positive electrode is oxygen, and
in the charge process, the charging is performed in a state where the magnesium secondary battery has been assembled and oxygen is supplied in a battery system.

9. The surface treating method according to claim 6, wherein
a charge capacity density in the charge process is less than or equal to a discharge capacity density in the initializing discharge process.

10. The surface treating method according to claim 6, wherein
just after the charge process, the negative electrode has an impedance of 100 Ωcm$^2$ or less just after the charge process.

11. The surface treating method according to claim 6, wherein
in the charge process, the charging is performed at a charge current density of 0.5 mA/cm$^2$ or higher.

12. The surface treating method according to claim 6, wherein
the magnesium film has a lower density than the negative electrode.

13. The surface treating method according to claim 6, wherein
the magnesium film on the surface of the negative electrode is formed to have a thickness larger than a thickness calculated based on the discharge capacity density.

14. The surface treating method according to claim 6, wherein
the magnesium film has voids with a pore diameter of 10 Å to 20 Å.

15. The surface treating method according to claim 6, wherein
the magnesium film has a composition containing oxygen.

16. The surface treating method according to claim 6, wherein
the magnesium film contains elemental magnesium and magnesium oxide.

17. The surface treating method according to claim 16, wherein
the magnesium oxide in the magnesium film contains magnesium peroxide and a magnesium monoxide.

18. The surface treating method according to claim 16, wherein
the magnesium oxide in the magnesium film is amorphous.

* * * * *